(12) United States Patent
James et al.

(10) Patent No.: US 8,939,466 B2
(45) Date of Patent: *Jan. 27, 2015

(54) AIRBAG FRAME APPARATUS

(71) Applicant: Judco Manufacturing, Inc., Harbor City, CA (US)

(72) Inventors: Stephen James, Highland Park, CA (US); Thomas E. Buttner, Palos Verdes Estates, CA (US); Igorce Srbinovski, Harbor City, CA (US)

(73) Assignee: Judco Partnership, LLC, Harbor City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,151

(22) Filed: Nov. 11, 2013

(65) Prior Publication Data

US 2014/0070520 A1    Mar. 13, 2014

Related U.S. Application Data

(63) Continuation-in-part of application No. 13/922,156, filed on Jun. 19, 2013, now Pat. No. 8,602,451, which is a continuation of application No. 13/033,499, filed on Feb. 23, 2011, now Pat. No. 8,491,003.

(60) Provisional application No. 61/307,349, filed on Feb. 23, 2010.

(51) Int. Cl.
*B60R 21/16* (2006.01)

(52) U.S. Cl.
USPC .......................................................... 280/731

(58) Field of Classification Search
USPC .................. 280/731, 728.2; 200/61.54, 61.55, 200/61.56, 61.57, 239, 243, 245, 341, 344, 200/345; 74/484 R, 552; 411/353, 508, 509, 411/516, 517, 518

See application file for complete search history.

(56) References Cited

U.S. PATENT DOCUMENTS

| 2,667,083 A | 1/1954 | Russell |
| 4,785,144 A | 11/1988 | Fosnaugh et al. |

(Continued)

FOREIGN PATENT DOCUMENTS

| WO | 2007060848 A1 | 5/2007 |
| WO | 2009044734 A1 | 4/2009 |

OTHER PUBLICATIONS

"Engage" Definition, Automotive Dictionary, available at http://www.motorera.com/dictionary/EN.HTM (last visited Jul. 23, 2012), 1p.

(Continued)

*Primary Examiner* — Faye M. Fleming
(74) *Attorney, Agent, or Firm* — Michael Zarrabian, Esq.

(57) ABSTRACT

An apparatus includes a frame having multiple openings for slidably receiving multiple airbag support assemblies. Each support assembly includes an airbag coupling member slidably disposed in a one of the openings in the frame for maintaining a spring member between the frame and the airbag device. The airbag coupling member has a coupling end protruding from a first side of the frame facing the airbag device for connecting to the airbag device. Pressing the airbag device towards the frame compresses the spring member therebetween. An electrical switch assembly is connected to the frame. The electrical switch assembly includes an electrical switch for a circuit. The electrical switch has a push button that continuously engages the airbag device when the frame is connected to the airbag device via an airbag coupling member, to maintain the electrical switch between the frame and the airbag device.

20 Claims, 31 Drawing Sheets

(56) References Cited

U.S. PATENT DOCUMENTS

| | | | |
|---|---|---|---|
| 4,963,704 | A | 10/1990 | Buma et al. |
| 5,283,404 | A | 2/1994 | Prescaro, Jr. |
| 5,331,124 | A | 7/1994 | Danielson |
| 5,350,190 | A | 9/1994 | Szigethy |
| 5,410,114 | A | 4/1995 | Furuie et al. |
| 5,508,482 | A | 4/1996 | Martin et al. |
| 5,630,611 | A | 5/1997 | Goss et al. |
| 5,639,113 | A | 6/1997 | Goss et al. |
| 5,931,492 | A | 8/1999 | Mueller et al. |
| 6,008,460 | A | 12/1999 | Demari |
| 6,161,863 | A | 12/2000 | Fujita et al. |
| 6,364,344 | B2 | 4/2002 | Hudd et al. |
| 6,474,682 | B2 | 11/2002 | Ikeda et al. |
| 6,478,330 | B2 | 11/2002 | Fujita |
| 6,600,114 | B2 | 7/2003 | Kikuta et al. |
| 6,867,690 | B2 | 3/2005 | Gioutsos et al. |
| 6,951,348 | B2 | 10/2005 | Enders |
| 6,953,204 | B2 | 10/2005 | Xu et al. |
| 7,121,581 | B2 | 10/2006 | Xu et al. |
| 7,159,897 | B2 | 1/2007 | Worrell et al. |
| 7,268,309 | B2 | 9/2007 | Sugimoto |
| 7,322,602 | B2 | 1/2008 | Tsujimoto et al. |
| 8,602,451 | B2 * | 12/2013 | James et al. .......... 280/731 |
| 2002/0125698 | A1 | 9/2002 | Schutz |
| 2002/0153708 | A1 | 10/2002 | Kreuzer |
| 2004/0026908 | A1 | 2/2004 | Schneider et al. |
| 2004/0052611 | A1 | 3/2004 | Liu |
| 2006/0131851 | A1 | 6/2006 | Tsujimoto et al. |
| 2006/0197323 | A1 | 9/2006 | Pillsbury et al. |
| 2007/0071578 | A1 | 3/2007 | Shinozaki et al. |
| 2008/0100040 | A1 | 5/2008 | DePottey et al. |
| 2009/0079168 | A1 | 3/2009 | Umemura et al. |
| 2009/0085334 | A1 | 4/2009 | Matsu et al. |
| 2009/0261560 | A1 | 10/2009 | Nakagawa et al. |
| 2010/0066062 | A1 | 3/2010 | Suzuki et al. |
| 2010/0224465 | A1 | 9/2010 | Hayashi et al. |

OTHER PUBLICATIONS

Bracket Definition, Merriam-Webster's Collegiate Dictionary, p. 137 (10th ed. 2000).

U.S. Non-Final Office Action dated Jul. 25, 2012 for U.S. Appl. No. 13/033,499.

U.S. Final Office Action dated Dec. 10, 2012 for U.S. Appl. No. 13/033,499.

U.S. Notice of Allowance dated Mar. 19, 2013 for U.S. Appl. No. 13/033,499.

U.S. Notice of Allowance dated Aug. 8, 2013 for U.S. Appl. No. 13/922,156.

* cited by examiner

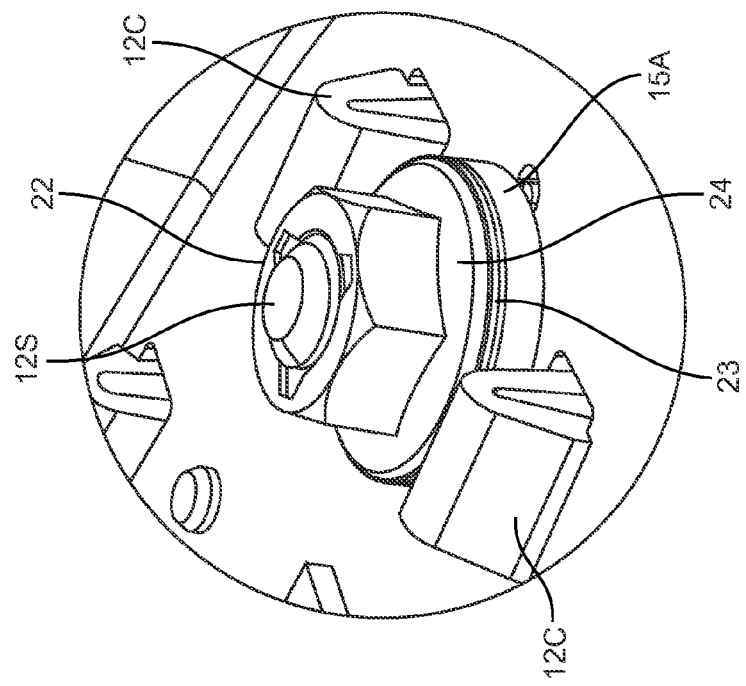
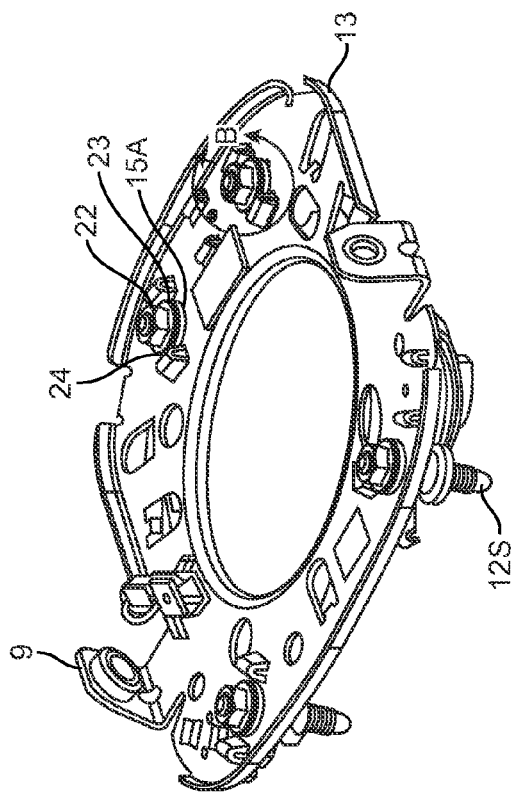

AIRBAG FRAME APPARATUS

CROSS-REFERENCES TO RELATED APPLICATIONS

This application is a continuation-in-part of U.S. patent application Ser. No. 13/922,156 filed on Jun. 19, 2013, which is a continuation of U.S. patent application Ser. No. 13/033,499 filed on Feb. 23, 2011, now U.S. Pat. No. 8,491,003, which in turn claims priority from U.S. Provisional Patent Application Ser. No. 61/307,349, filed on Feb. 23, 2010, all incorporated herein by reference in their entirety.

BACKGROUND

1. Field of the Invention

The embodiments relate to air bag devices, and in particular, to air bag frames and systems.

2. Description of the Related Art

Airbags are used as safety equipment in vehicles, such as automobiles and trucks. Airbags are mounted in various places in vehicles, such as dashboards and steering wheels. The mounting of airbags in steering wheels protects a driver from contacting the hard surface of a steering wheel in an accident. The steering wheel mounted airbag can make placement of other vehicle features typically mounted to a steering wheel challenging.

SUMMARY

One embodiment of the invention comprises an apparatus including comprising a frame having a plurality of openings for slidably receiving a plurality of airbag support assemblies. In one embodiment, each support assembly includes an airbag coupling member slidably disposed in a one of the openings in the frame for maintaining a spring member between the frame and the airbag device. In one embodiment, the airbag coupling member has a coupling end protruding from a first side of the frame facing the airbag device for connecting to the airbag device. Pressing the airbag device towards the frame compresses the spring member therebetween. In one embodiment, an electrical switch assembly is connected to the frame. The electrical switch assembly includes an electrical switch for an electrical circuit. In one embodiment, the electrical switch has a push button that continuously engages the airbag device when the frame is connected to the airbag device via an airbag coupling member, to maintain the electrical switch between the frame and the airbag device.

Another embodiment of the invention comprises a system including a vehicle airbag element. A frame supports the vehicle airbag element. One or more support assemblies each are slidably coupled to an opening in the frame. Each support assembly comprises an airbag coupling member having a coupling end engaged to the airbag element. In one embodiment, the airbag coupling member maintains a spring member between the frame and the airbag device such that pressing the airbag element towards the frame compresses the spring member therebetween. In one embodiment, an electrical switch assembly coupled to the frame. The electrical switch assembly comprises at least one pushbutton for an electrical switch that couples to an electrical circuit. The at least one pushbutton is continuously engaged with the airbag element.

Yet another embodiment of the invention comprises a system including a vehicle airbag device. In one embodiment, an essentially planar frame supports the airbag device. In one embodiment, the frame has a plurality of openings for slidably receiving a plurality of airbag support assemblies transverse to the frame. In one embodiment, the frame further comprises a steering wheel coupling portion configured for coupling the frame to a steering wheel. Each support assembly comprises: an airbag coupling member slidably disposed in a corresponding one of said openings in the frame for maintaining a spring member between the frame and the airbag device. In one embodiment, the airbag coupling member has a coupling end protruding from a first side of the frame facing the airbag device for coupling to the airbag device. In one embodiment, pressing the airbag device towards the frame compresses the spring member therebetween. In one embodiment, the airbag coupling member has a locking member at a locking end of the airbag coupling member protruding from a second side of the frame opposing said first side, for slidably maintaining the frame on the airbag coupling member between the locking member and the airbag device. In one embodiment, each support assembly further includes an electrical switch assembly that is coupled to the frame. In one embodiment, the electrical switch assembly comprises at least one push button for an electrical switch for coupling to an electrical circuit. In one embodiment, the at least one pushbutton is continuously engaged with the airbag device.

Other aspects and advantages of the present invention will become apparent from the following detailed description, which, when taken in conjunction with the drawings, illustrate by way of example the principles of the invention.

BRIEF DESCRIPTION OF THE DRAWINGS

The embodiments are illustrated by way of example, and not by way of limitation, in the Figures of the accompanying drawings and in which like reference numerals refer to similar elements and in which:

FIG. 22 illustrates a bottom perspective view of an airbag frame device showing a locking/fastening portion of a support assembly for an airbag frame plate according to another embodiment of the invention; and FIG. 23 illustrates an isolated view of a locking/fastening portion of a support assembly for an airbag frame device according to one embodiment of the invention.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of an airbag frame apparatus and system, as well as operation and/or component parts thereof. While the following description will be described in terms of airbag frame systems and devices for clarity and to place the invention in context, it should be kept in mind that the teachings herein may have broad application to all types of systems, devices and applications.

One embodiment of the invention provides an airbag frame support device (apparatus) including a frame and support assemblies, wherein the frame is configured for supporting a vehicle airbag and mounting on the vehicle steering wheel. The support assemblies are coupled to the frame, wherein each support assembly includes a spring member. An electrical switch assembly comprising one or more electrical switches is also coupled to the frame, wherein the electrical switch assembly provides electrical connections to electrical components such as a horn.

Applying pressure on a support assembly for compressing the support assembly a predetermined distance lowers, and urges, at least a portion of the spring member of the support assembly towards a switch in the electrical switch assembly. The switch closes an electrical circuit that operates an electrical component. Removing pressure from the support assembly allows the spring member to decompress and move away from the switch, wherein the switch opens the electrical circuit.

Figure 1:
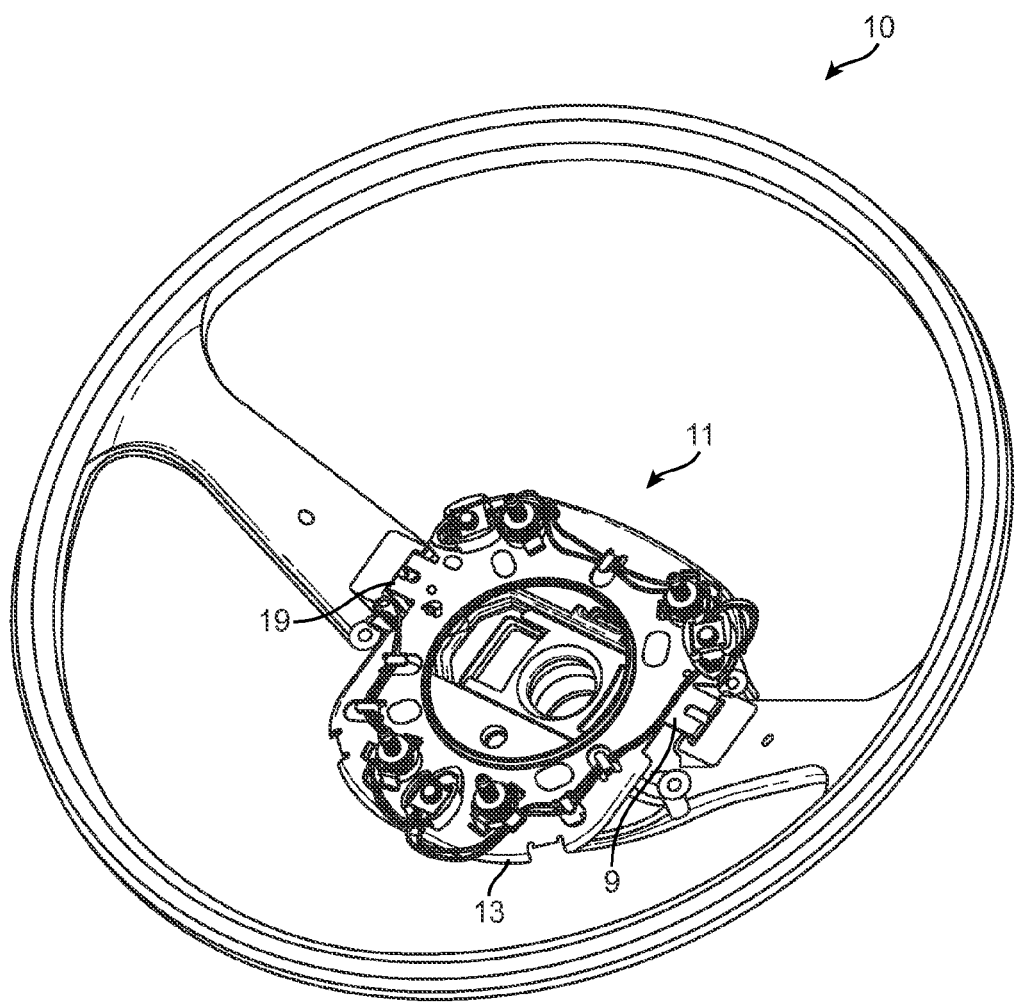
FIG. 1 illustrates a perspective view of an airbag frame device coupled with a steering wheel according to one embodiment of the invention.

FIG. 1 illustrates a perspective view of an airbag frame support device 11 coupled with a steering wheel 10 of a vehicle according to one embodiment of the invention. In one example, the airbag frame support device 11 is removably mounted/fastened to a central portion of the steering wheel 10 of a vehicle, such as an automobile, truck, etc.

Figure 2:
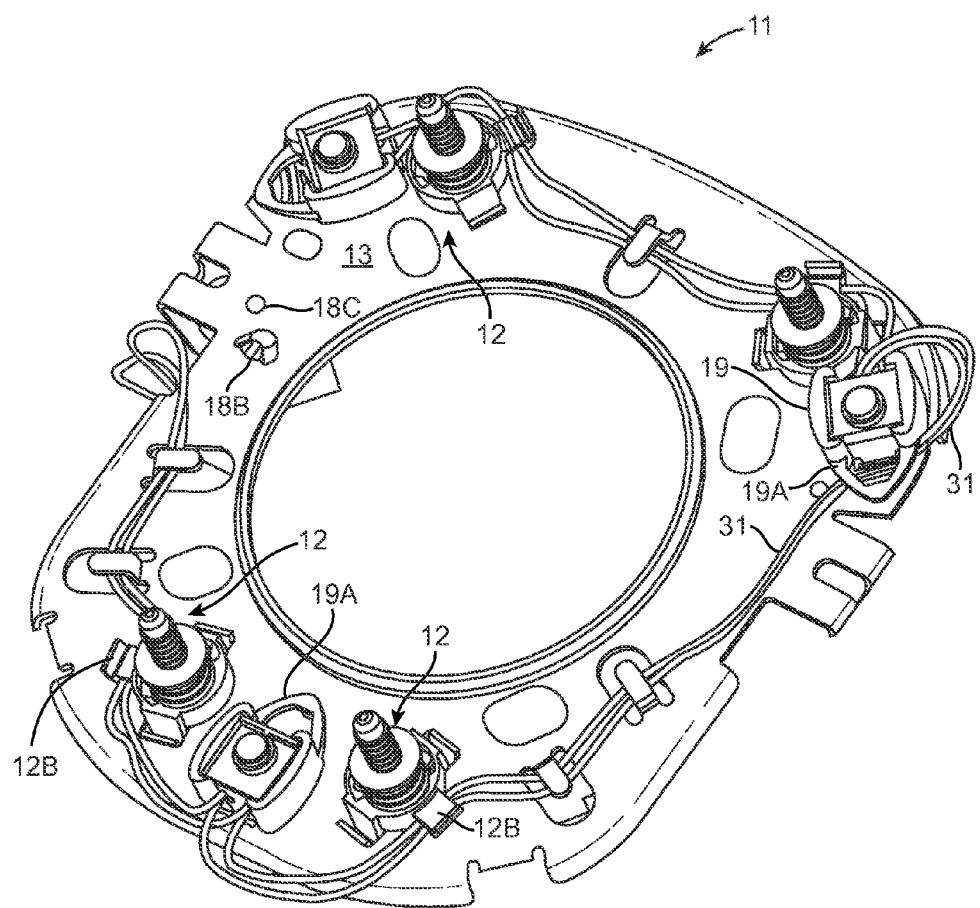
FIG. 2 illustrates a top perspective view of an airbag frame device according to one embodiment of the invention.
Figure 7:
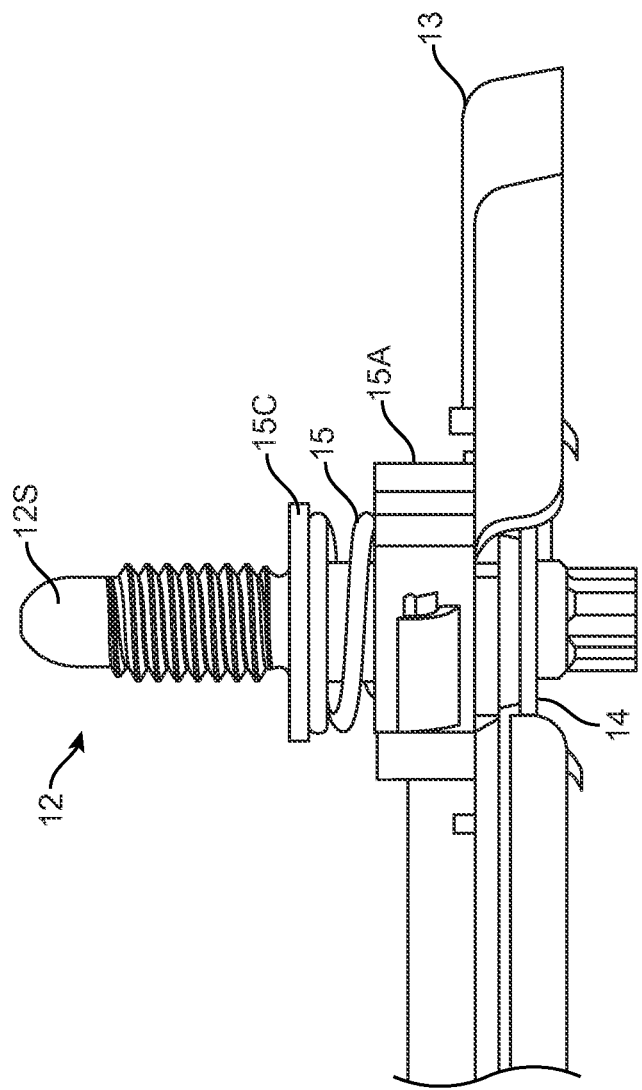
FIG. 7 illustrates an isolated side view of a support assembly coupled to an airbag frame plate according to one embodiment of the invention.

FIG. 2 illustrates a top perspective view of an airbag frame support device 11, according to one embodiment of the invention. In one embodiment of the invention, the airbag frame support device 11 includes a frame plate 13 and multiple airbag support assemblies 12, each support assembly including a spring member 15 (FIG. 7). The airbag frame support device 11 further includes an electrical assembly comprising switches 19 each having a switch assembly tab 19A, and electrical wires 31. As used herein, a spring member can comprise an elastic object (e.g., a compression spring, coiled spring, leaf spring), and may be made from materials that can store mechanical energy, as those skilled in the art will recognize.

In one embodiment, the tab 19A is situated a distance above the frame plate 13 to provide clearance allowing passage of electrical wires 31 underneath the tab 19A and to provide wire management. Each tab 19A maintains wires 31 passing thereunder, thereby protecting the electrical wire 31 from forces and vibrations from movement of a vehicle.

In one example, the switches 19 are push or pressure switches using a flexible member, such as a spring or equivalent compressible component. Each switch 19 may comprise a normally open, momentary switch. In one example, the airbag frame support device 11 includes multiple switches 19. Each switch 19 includes legs 19C (FIG. 13) that allow snapping the switch into corresponding holes in the plate 13.

Figure 3:
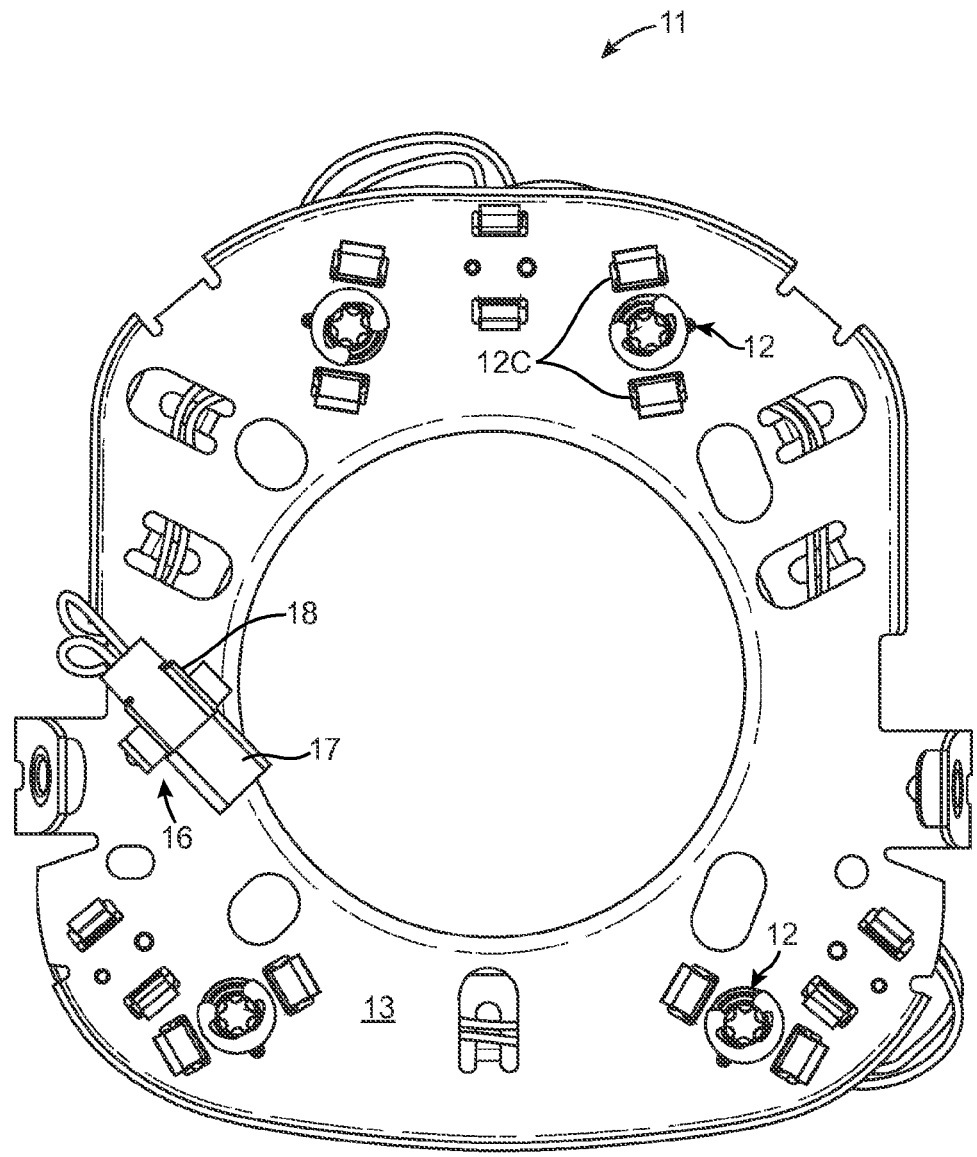
FIG. 3 illustrates a bottom view of the airbag frame device shown in FIG. 2.
Figure 4:
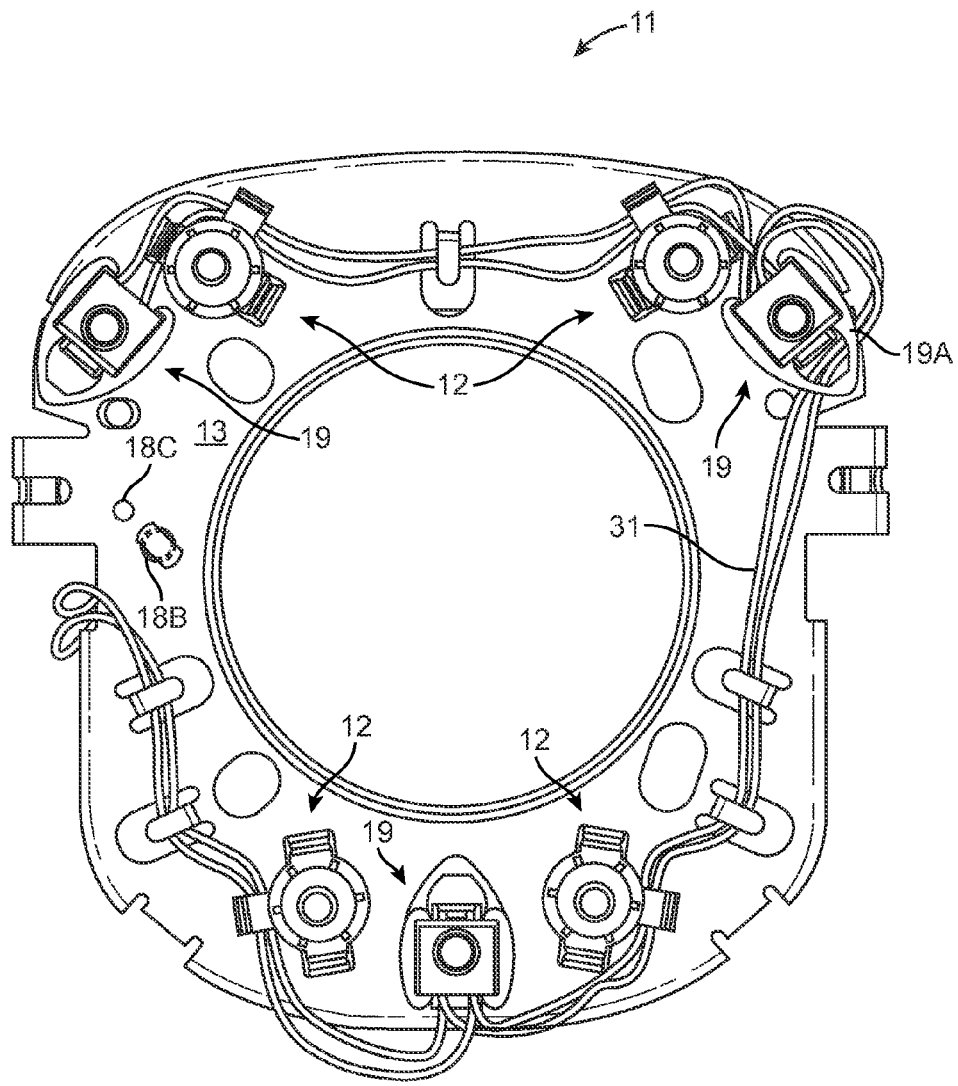
FIG. 4 illustrates a top view of the airbag frame device shown in FIG. 2.

FIG. 3 illustrates a bottom view of the airbag frame support device 11, and FIG. 4 illustrates a top view of the airbag frame support device 11. In one embodiment, the frame support device 11 further includes a wiring harness assembly 16. The wiring harness assembly 16 includes a wiring harness holder 18 and an electrical connector 17, wherein the electrical connector 17 is removably received and maintained by the wiring harness holder 18. In one embodiment, the electrical connector 17 of the wiring harness assembly 16 is configured for connecting to a corresponding electrical horn connector.

Figure 8:
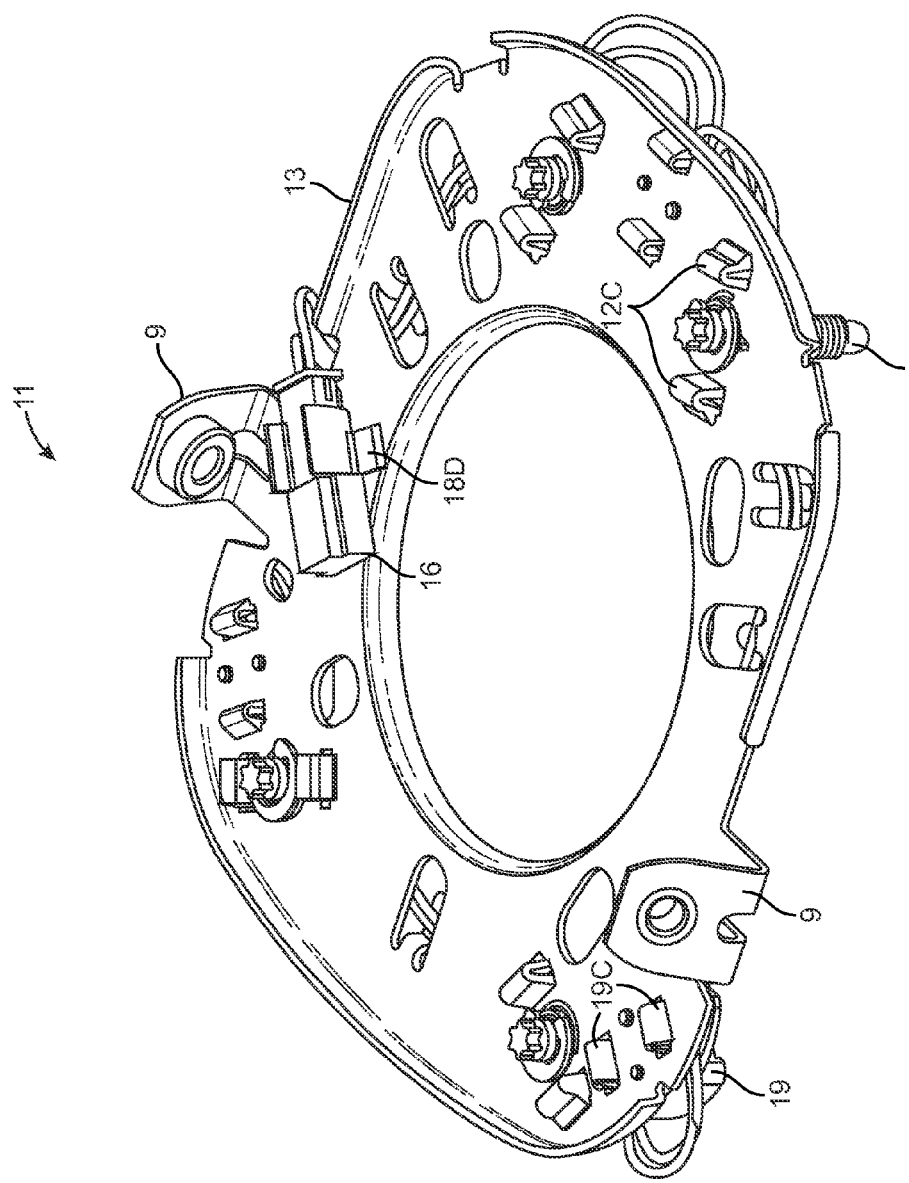
FIG. 8 illustrates a side perspective view of the airbag frame device shown in FIG. 2.

The wiring harness 16 is coupled to frame plate 13 via a wiring harness holder tab 18D (FIG. 8). The electrical wires 31, switches 19 and an electrical connector 17 (FIG. 9) are coupled to a wiring harness assembly 16. In one example the wiring harness holder 18 snaps into openings in the frame plate 13.

In one embodiment, the harness holder 18 includes an insertion tip 18B and a tab 18C. In one example, the insertion tip 18B and the tab 18C are inserted through corresponding apertures of the frame plate 13 to snap the harness holder 18 onto the frame plate 13. In one embodiment of the invention, the tab 18C prevents the harness holder 18 from rotating on the frame plate 13.

FIG. 8 illustrates a bottom perspective view of the airbag frame support device 11. As illustrated, wherein tabs 18D of the holder 18 rest on a bottom surface of the frame plate 13 for additional support and prevention of movement of the wiring harness assembly 16.

In one embodiment, the support assemblies 12 and the switches 19 and wiring harness assembly 16 are removably attached (snapped) on the frame plate 13 using corresponding openings/through-holes on the frame plate 13. The support assemblies and switches may be moved to other locations on the frame plate 13 where there are holes for snapping them onto the frame plate 13. Further, in one example, a support assembly 12 may be replaced as needed without replacing all of the support assemblies 12.

In one embodiment, the frame plate 13 can be made of a metal with a central aperture about 74 mm in radius. In other embodiment, the central aperture may have a range between about 65 mm to 85 mm.

In one embodiment, each support assembly 12 may include an airbag coupling member 12S (FIG. 7) such as a screw or bolt type element made of a metal, metal alloy, etc. In one example, each support assembly 12 may comprise zinc plated steel.

Figure 5:
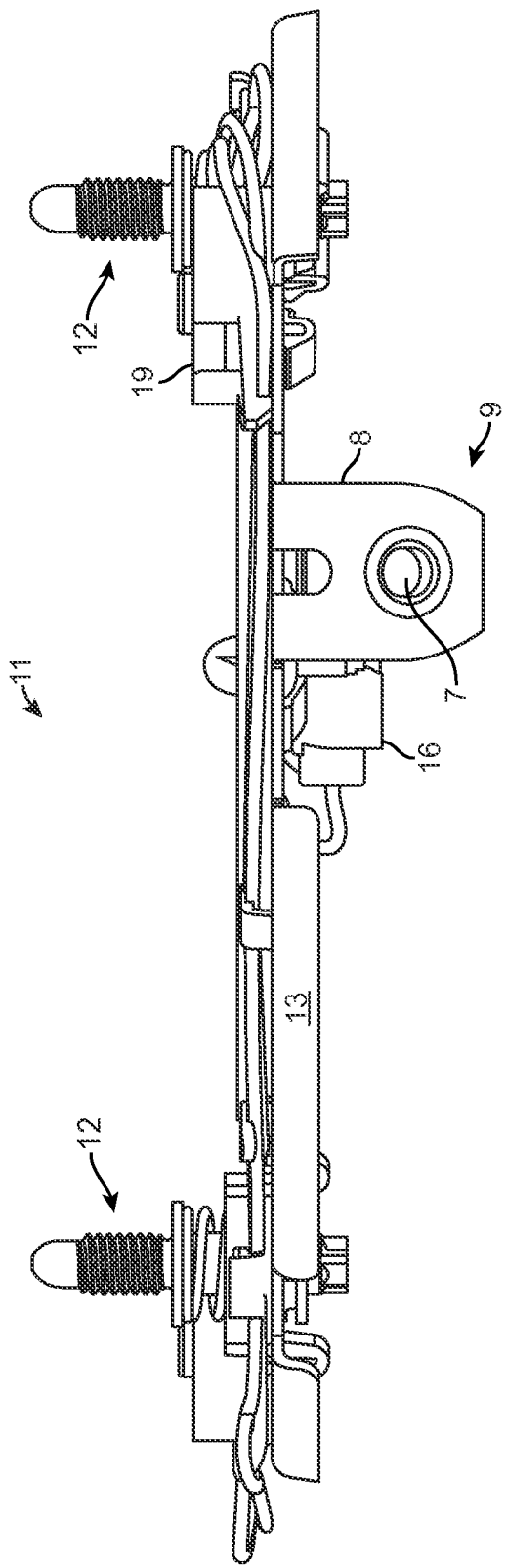
FIG. 5 illustrates a left side view of the airbag frame device shown in FIG. 2.
Figure 6:
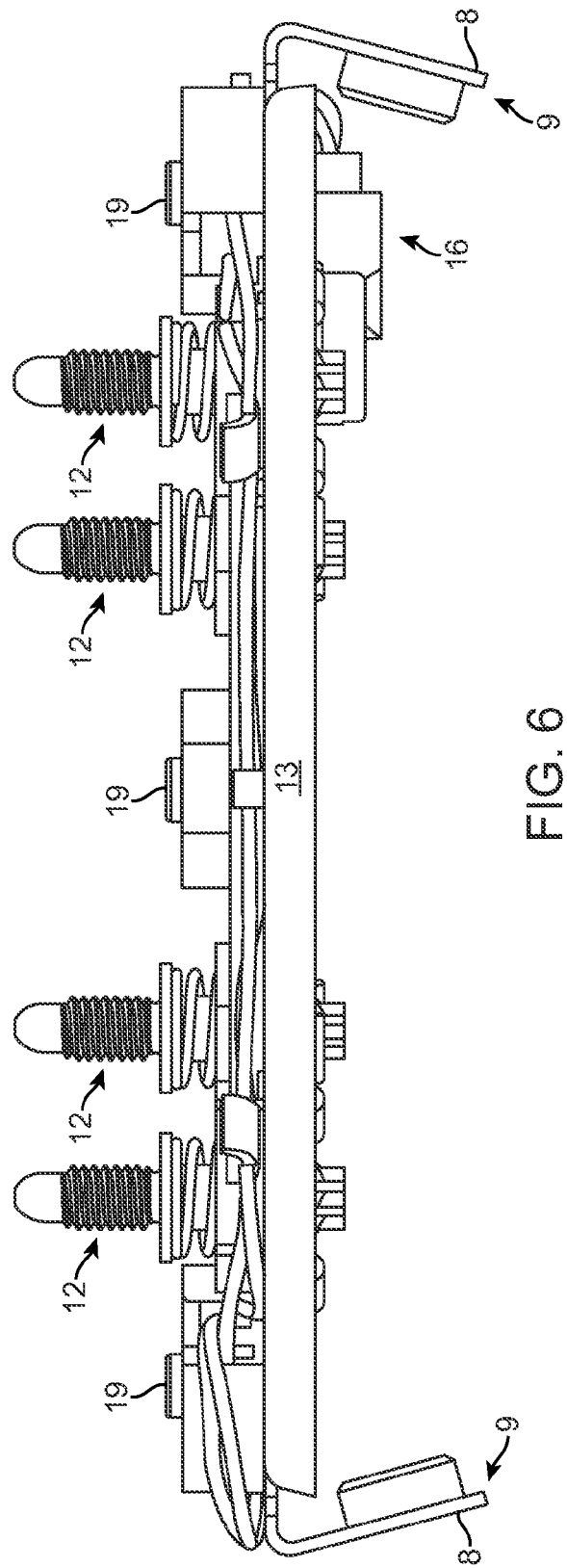
FIG. 6 illustrates a front view of the airbag frame device shown in FIG. 2.
Figure 18:
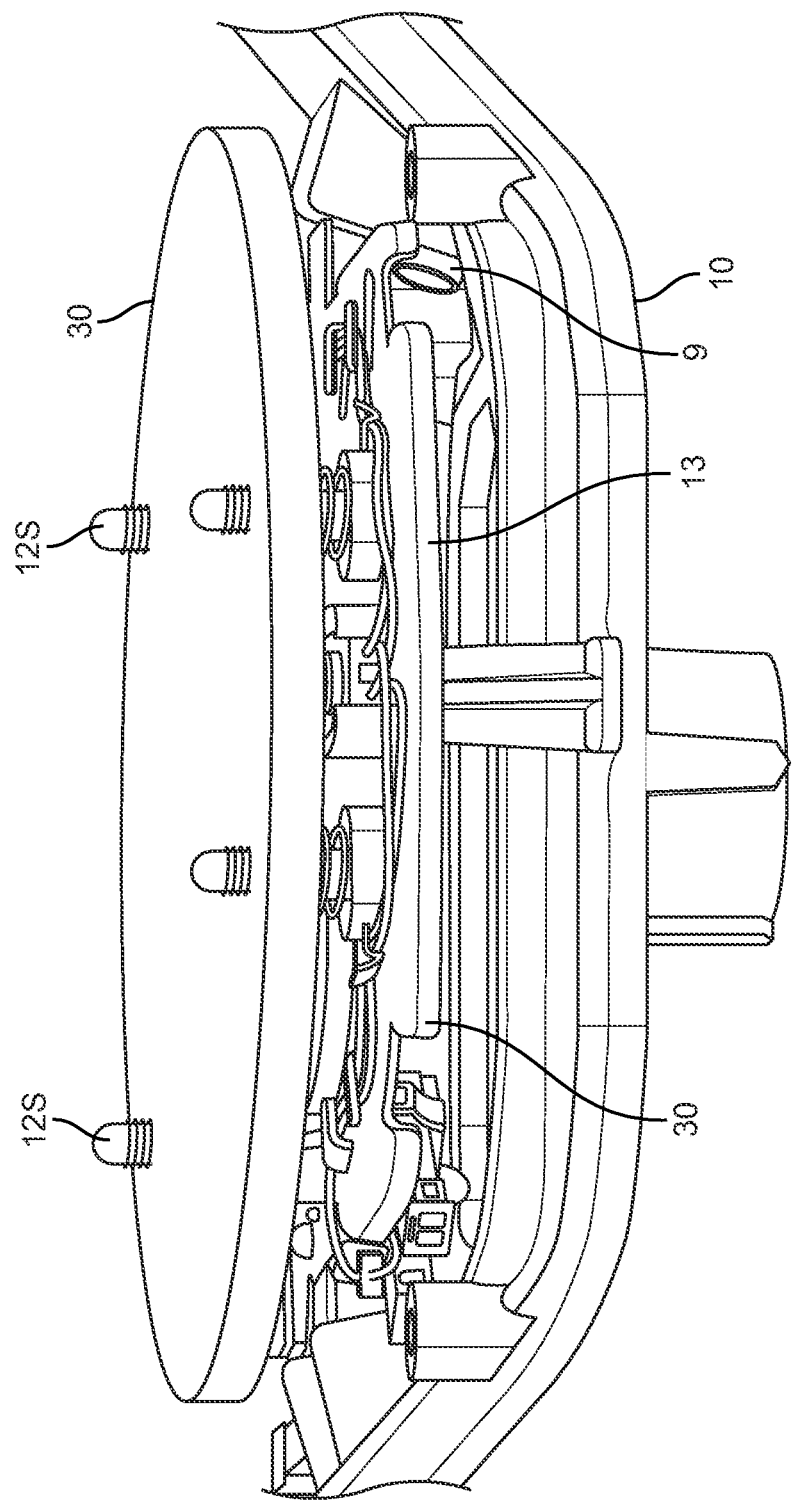
FIG. 18 illustrates a front perspective view of an airbag frame device coupled with an airbag assembly and steering wheel column/housing according to one embodiment of the invention.

FIG. 5 illustrates a left side view of the airbag frame support device 11. FIG. 6 illustrates a front view of the airbag frame support device 11. In one example, the support assemblies 12 are symmetrically positioned on the frame plate 13 to align with corresponding attachment portions of an airbag assembly 30 (FIG. 18). In another example, the support assemblies 12 may be asymmetrically positioned on the frame plate 13 as needed to align with corresponding attachment portions of an airbag assembly 30. In one example, the position, size and shape of the various openings and through-holes on the frame plate 13 may be adapted as desired based on, for example, attachment points to an airbag assembly, size of a steering wheel unit, thickness of the attached elements, etc.

FIG. 7 illustrates a side view of a support assembly 12 coupled to the frame plate 13, according to one embodiment of the invention. In one embodiment, each support assembly 12 further comprises a bracket 15A including an aperture that surrounds the coupling member 12S. Each bracket 15A includes legs 12C (FIG. 3) that snap into corresponding openings in the frame plate 13. Each bracket 15A is held in place on the plate 13 by snapping legs 12C of the bracket 15A in corresponding openings in the plate 13.

Each coupling member 12S includes a flange 15C at a distance below the tip of the coupling member 12S, wherein the compression member 15 is disposed between the flange 15C and a bottom wall 15B of the bracket 15A (FIG. 14), concentric with the coupling member 12S on the top surface of the plate 13. A lock type spring/clip 14 is snapped on a lower portion of the coupling member 12S under the bottom surface of the plate 13. Each coupling member 12S is held in place in an opening of the plate 13 wherein the compression member 15 is in compression between the flange 15C and the bottom wall 15B. In some embodiments a portion of the bottom wall 15B protrudes through the frame plate 13. In other embodiments, the bottom wall 15B is flush with the frame plate 13.

As such, the coupling member 12S of the support assembly 12 is held in place in the bracket (surround) 15A against the frame plate 13 with a compression member 15 (e.g., a spring), wherein the compression member 15 normally urges the clip 14 against the bottom side of the frame plate 13.

In one embodiment, the annular bracket 15A may comprise a plastic sleeve, a metal or metal alloy sleeve, etc. that is snapped to the frame plate 13 through an opening or through-hole. The frame plate 13 essentially "floats" on the support assemblies 12 between the snap or lock type spring/clips 14 and bottom walls 15B of the brackets 15A. The floating aspect is partly a matter of perception until the airbag frame device 11 is fully installed on a steering wheel, wherein the frame plate 13 is fixed to the steering wheel armature, and the support assemblies 12 and airbag assembly 30 (see FIG. 18) actually float.

In one example, the distance/clearance between the frame plate 13 and a flange 15C on the support assembly 12 is about 9.5 mm when the compression member 15 is uncompressed, and about 7.5 mm when the compression member 15 is fully compressed. Other examples may have other ranges of compression/expansion for the compression member 15, such as 7.5 mm-11.5 mm uncompressed, and 5 mm-9.5 mm compressed. In one example, a force of 3-4.5 lbs compresses the compression member 15 enough for the switch 19 to close. It should be noted that the combined compression members 15 accumulate the force necessary to sound a horn by a user when the external portion of an air bag assembly 30 is pressed by a user in the center. Therefore, the selection of the compression members 15 cannot be excessive which will cause a user to have to exert too much force to sound the horn. Therefore, some travel of the support assembly in the frame plate occurs when a vehicle is driven over a road that includes at least some bumps or unevenness. If the travel is reduced by increasing the strength of the compression members 15, use of a vehicle horn becomes a strain for users. Therefore, based on the necessity of maintaining ease of use for the horn, in one embodiment of the invention a damping element 23 (FIG. 22) is added to prevent/reduce buzz, squeak and rattle (BSR) caused by the travel of the support assembly.

As illustrated in the bottom perspective view of the airbag frame support device 11 in FIG. 8, each tab 18D rests on a bottom surface of the frame plate 13 for additional support and prevention of movement of the wiring harness assembly 16.

Figure 9:
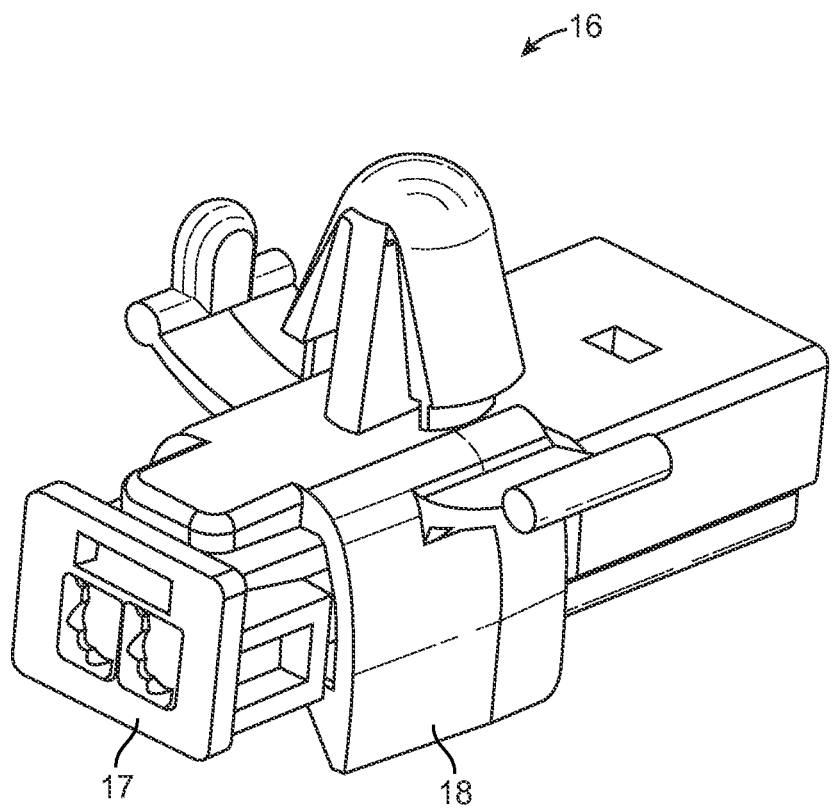
FIG. 9 illustrates an electrical connector shown connected with a harness holder according to one embodiment of the invention.

FIG. 9 illustrates a view of the wiring harness assembly 16 including the wiring harness holder 18 and the electrical connector 17 according to one embodiment of the invention. In one example, the wiring harness holder 18 is expandable so that the electrical connector 17 may be snapped into place within the wiring harness holder 18. In this example, the electrical connector 17 and wiring harness holder 18 comprise separate components. In another embodiment, the electrical connector 17 and wiring harness holder 18 are integrated into a single component.

Figure 10:
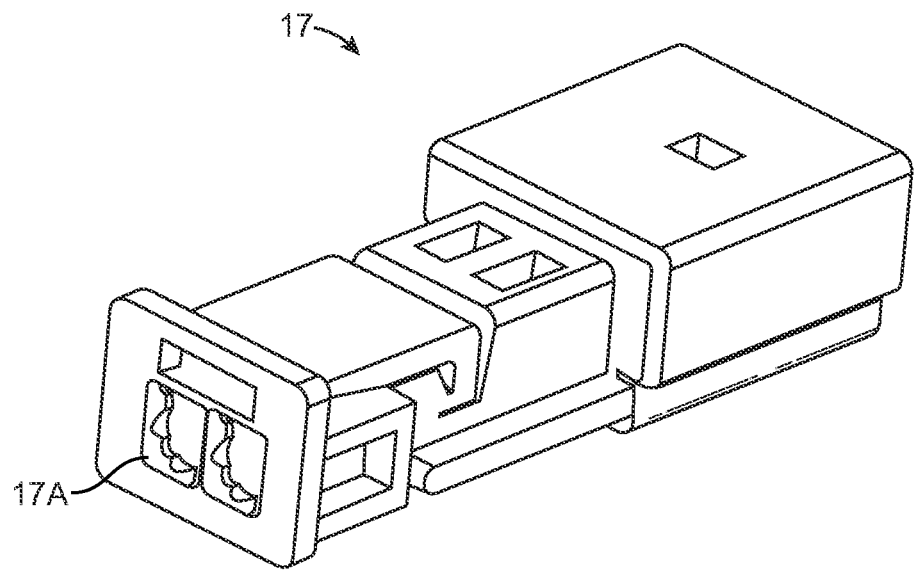
FIG. 10 illustrates an isolated view of an electrical connector according to one embodiment of the invention.

FIG. 10 illustrates an isolated view of the electrical connector 17 according to one embodiment of the invention. In one example, the electrical connector 17 includes inlet and outlet openings 17A for receiving electrical connections such as via wires. In one example, the electrical connector 17A includes metal pins attached to wires, which connect to the switches 19 in parallel. In another example, the electrical connector is attached to the frame plate 13 via a connector adapter.

Figure 11:
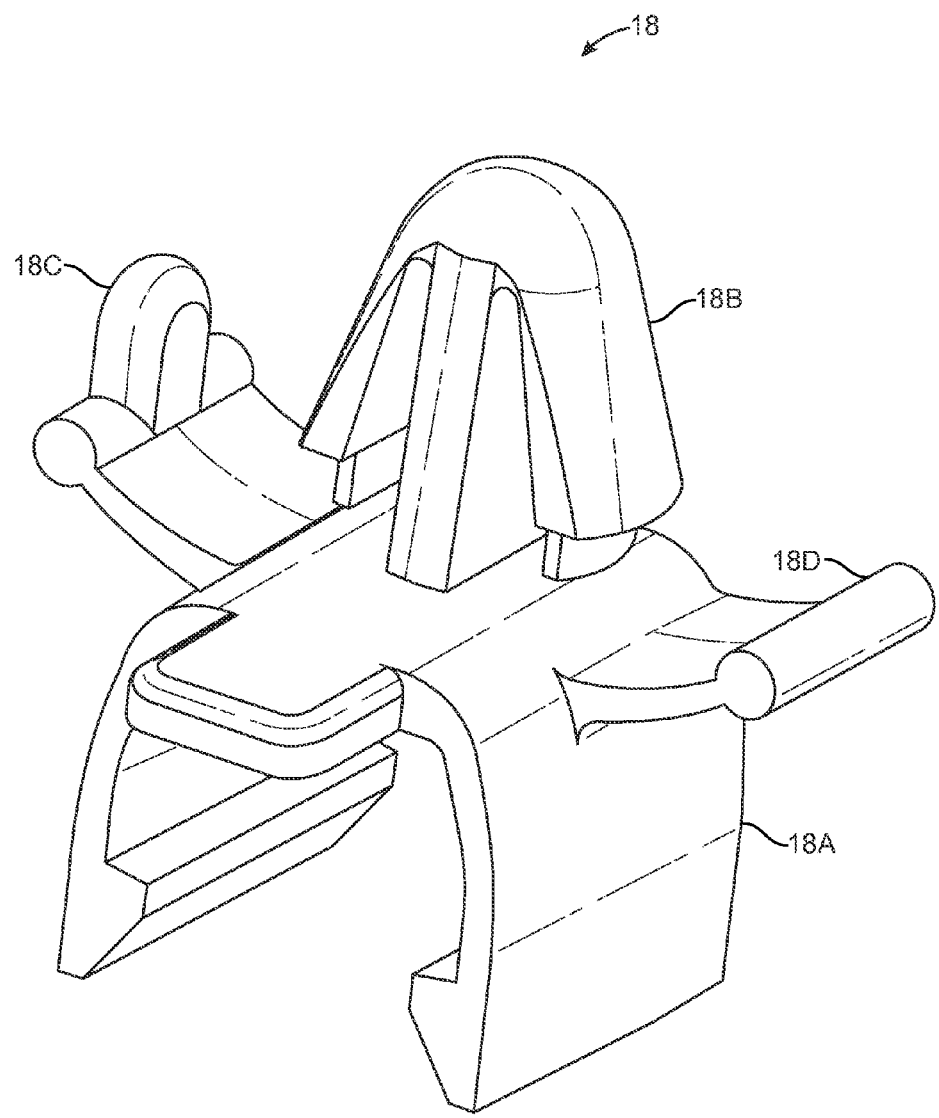
FIG. 11 illustrates an isolated view of a wiring harness holder for an electrical connector according to one embodiment of the invention.

FIG. 11 illustrates an isolated view of a wiring harness holder 18 for the electrical connector 17 according to one embodiment of the invention. In one example the legs 18A are used to snap the electrical connector 17 into the wiring harness holder 18 so that the electrical connector is held by compression force. The insertion tip 18B and tab 18C are sized for insertion through corresponding apertures of the frame plate 13. In this example, tab 18D rests on a bottom surface of the frame plate 13 for additional support and prevention of movement of the wiring harness assembly 16 for wire management.

Figure 12:
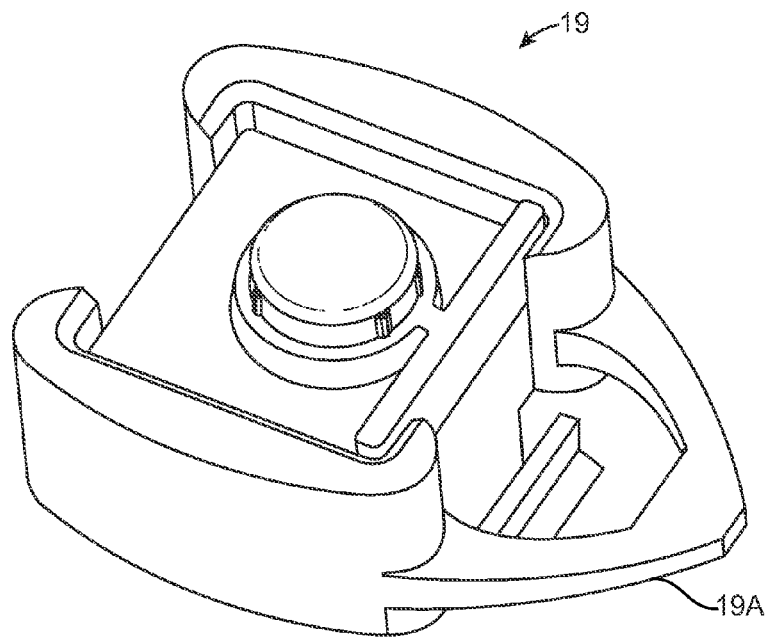
FIG. 12 illustrates a top perspective view of a switch according to one embodiment of the invention.

FIG. 12 illustrates a top perspective view of a switch 19 according to one embodiment of the invention. In one example, the switch 19 includes a switch body held by a switch attachment/cover element that includes switch assembly tab 19A. In another example the switch 19 is an integrated body that includes the switch and switch assembly tab 19A. It should be noted that a push switch can become damaged by excessive depression over time. In one example, the switch attachment/cover provides curved walls that provide a positive stop or limiter that prevents the switch button or plunger from being overly depressed from contact with the air bag assembly 30 (FIG. 18), which in turn provides a longer working product life expectancy for the switch 19 and limits damage to the inner workings of the switch (e.g., switch contact damage, spring damage, etc.). In one example, the body of switch 19 is made of plastic, metal, or similar strength material. In another example, the switch 19 may be other types of equivalent momentary switches.

Figure 13:
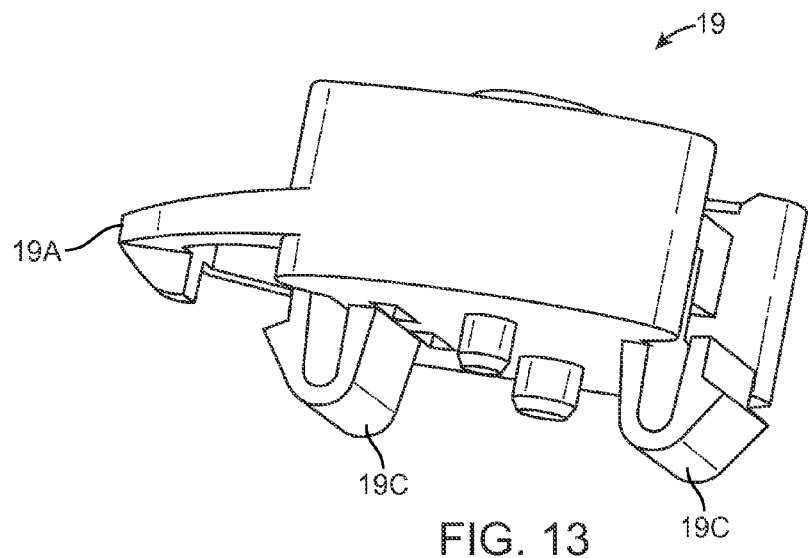
FIG. 13 illustrates a side perspective view of the switch shown in FIG. 12.

FIG. 13 illustrates a side perspective view of the switch 19. In one example, the switch assembly tab 19A includes a projection that may reside slightly above the frame plate 13 providing a bridge for the electrical wires 31 to pass underneath when the projection is forced to contact the frame plate 13 when the switch 19 is attached into openings in the frame plate 13, which also a provides wire management function.

Figure 14:
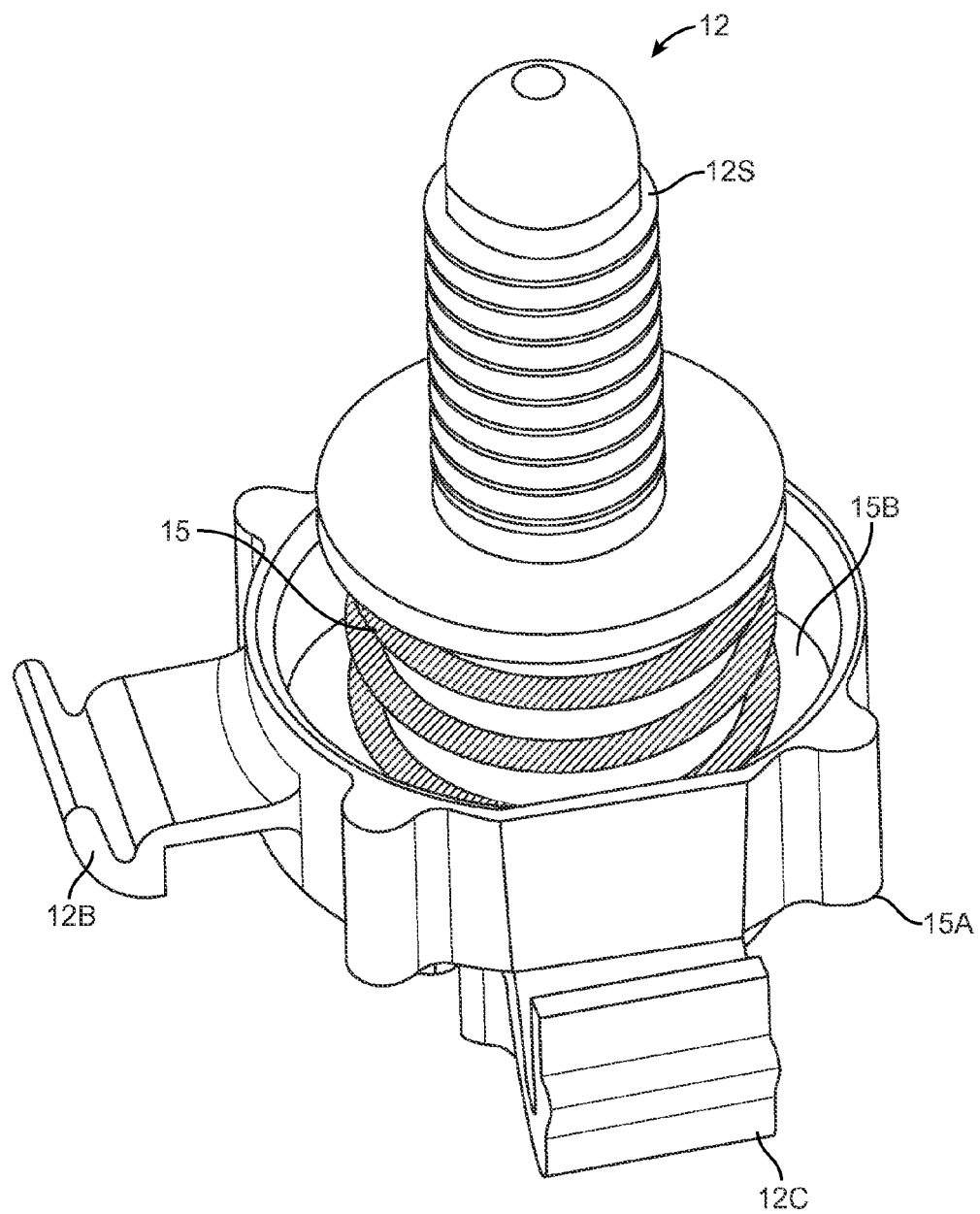
FIG. 14 illustrates a top perspective view of a support assembly coupled with a frame attachment portion for an airbag frame apparatus according to one embodiment of the invention.

FIG. 14 illustrates a top perspective view of a support assembly 12 coupled with a frame attachment portion 15A according to one embodiment of the invention. As noted, the bracket 15A has a bottom wall 15B pinched between the frame plate 13 and the compression member 15. In this example, the arrangement allows proper functioning of the airbag frame device 11 in normal (i.e., airbag in a ready and un-deployed), as well as in airbag deployment modes. In this example, the airbag frame device 11 is robust, and simple to install.

Figure 15A:
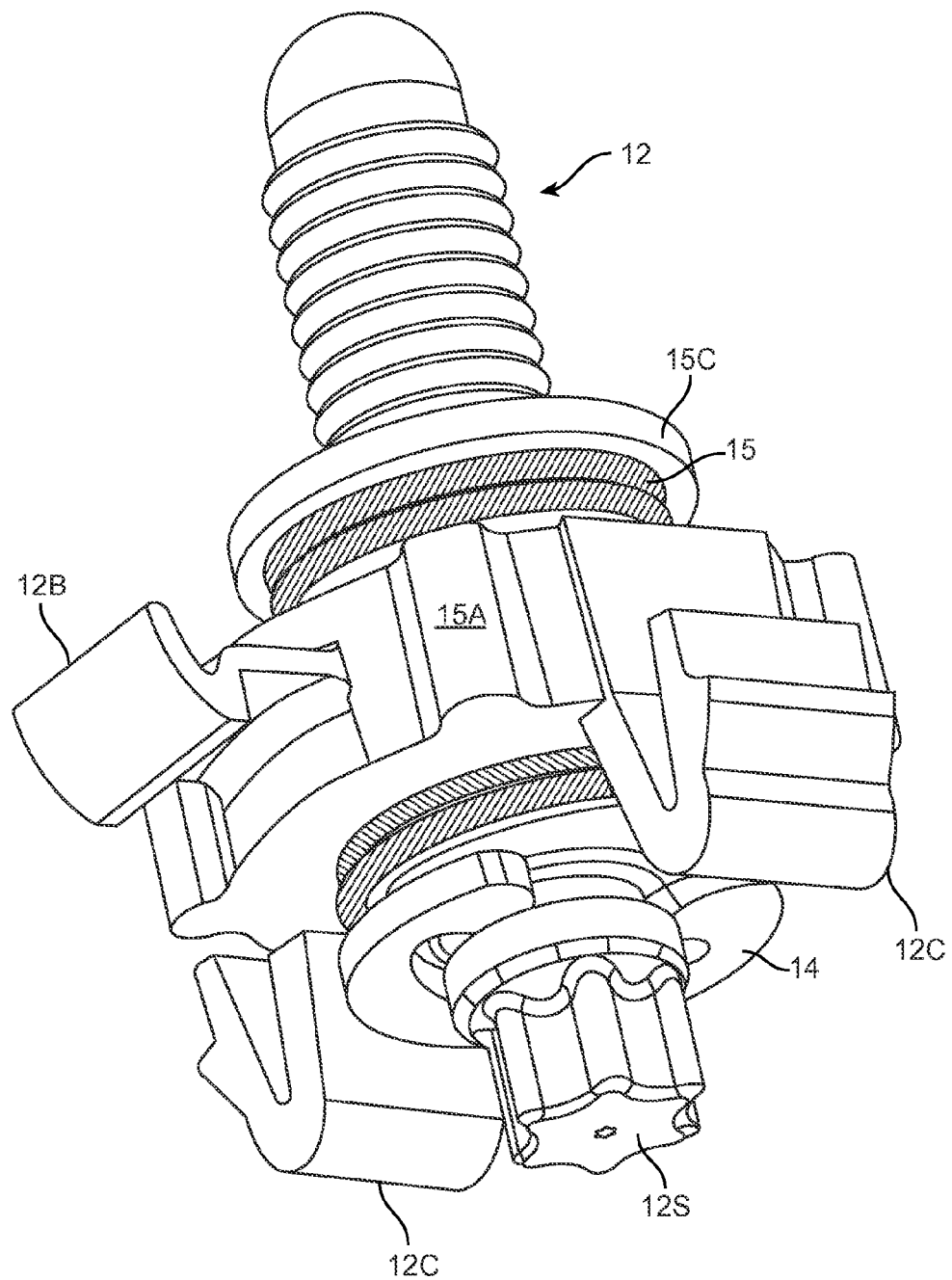
FIG. 15A illustrates a side perspective view of a support assembly coupled with a frame coupler for an airbag frame apparatus according to one embodiment of the invention.

FIG. 15A illustrates a side perspective view of the support assembly 12 coupled with the holder 15A according to one embodiment of the invention. In one example, tab 12B extends from the holder 15A and functions as a bridge to hold the electrical wires 31 underneath against the top face of the plate 13 (FIG. 2). The legs 12C snap into correspondingly sized openings in the frame plate 13.

Figure 15B:
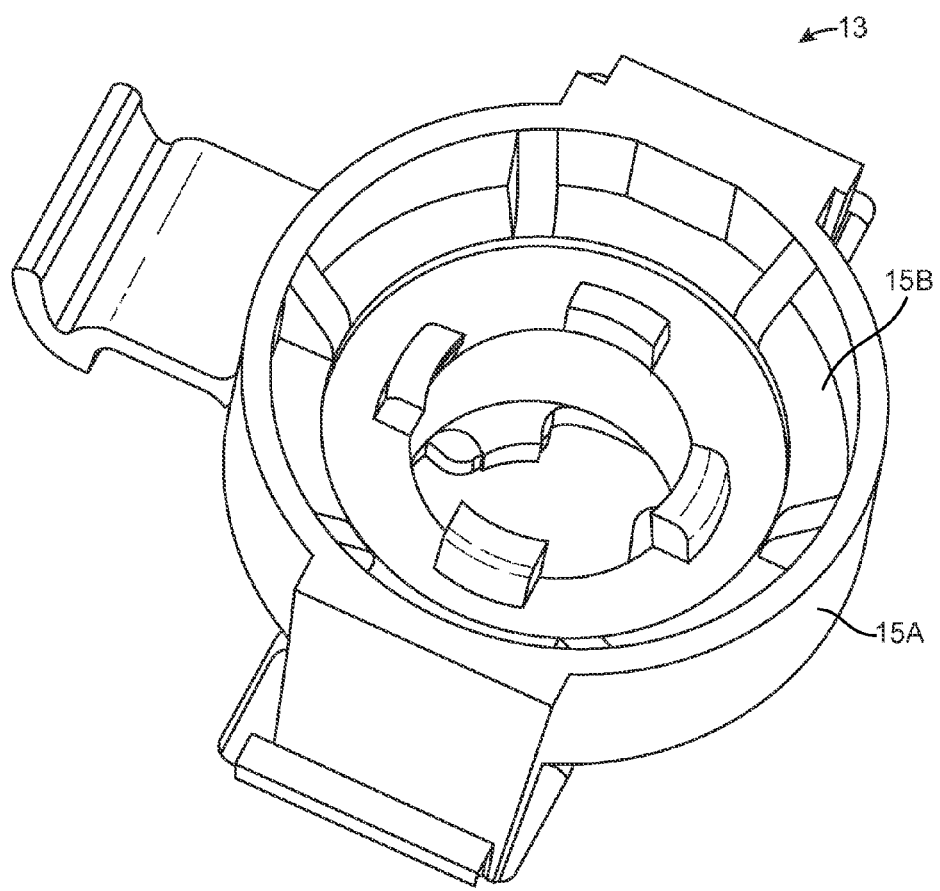
FIG. 15B illustrates a side perspective isolated view of a frame coupler for a support assembly of an airbag frame apparatus according to one embodiment of the invention.

FIG. 15B illustrates a top isolated perspective view of the holder 15A according to one embodiment of the invention. As illustrated, the holder 15A includes an opening slot for the support assembly 12.

Figure 16:
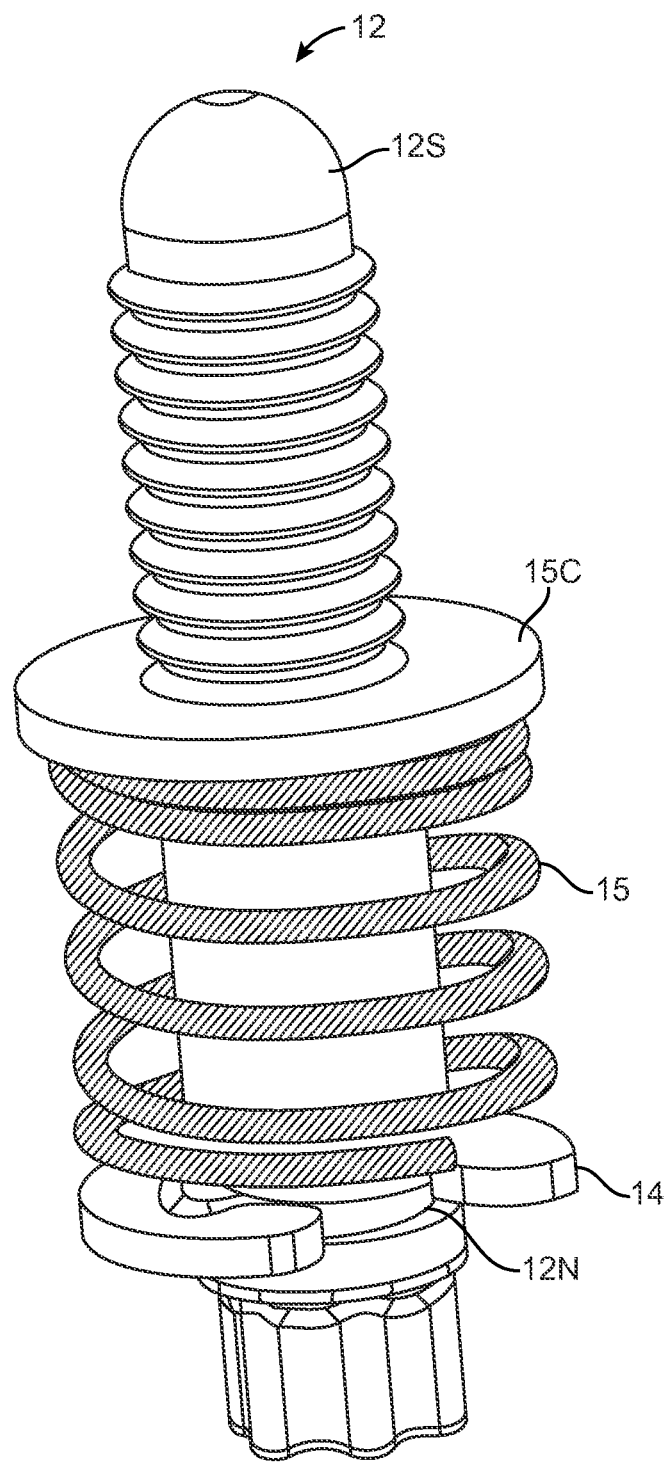
FIG. 16 illustrates a perspective view of an isolated support assembly for an airbag frame apparatus according to one embodiment of the invention.

FIG. 16 illustrates a perspective view of an isolated support assembly 12 according to one embodiment of the invention. In this example, the distance between a snap or lock type spring/clip 14 and the flange 15C on the coupling member 12S is about 10.7 mm when the compression member 15 is not compressed, and about 8.7 mm when the compression member 15 is fully compressed. Each type spring/clip 14 is snapped into a notch 12N on the airbag coupling member 12S. It should be noted that the internal gaps between the components, such as the support assembly 12, the frame plate 13, the compression member 15, flange 15C and the switch 19 control the size of external gaps of a steering wheel and external air bag and horn covering elements. Therefore, in one embodiment of the invention the gaps are limited by controlling the distance needed to move the support assembly to contact the switch 19 for causing the horn to function. Additionally, in cases where the frame plate may become bent (e.g., from excessive force), it is important for the gap dimensions to be maintained to prevent the horn from being sounded due forces from normal driving conditions (e.g., traveling over a bumpy road, potholes, etc.).

Figure 17A:
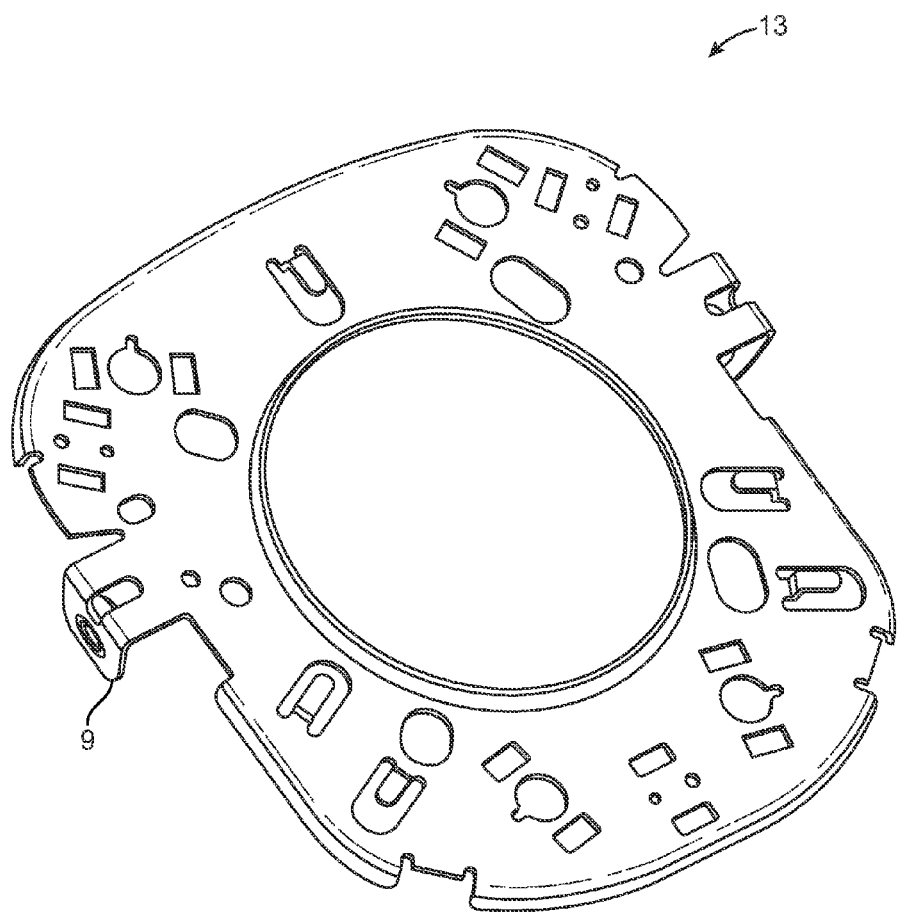
FIG. 17A illustrates a top perspective view of an isolated airbag support frame according to one embodiment of the invention.

FIG. 17A illustrates a top perspective view of an isolated frame plate 13 according to one embodiment of the invention. In one example, the frame plate 13 includes a variety of openings and through-holes of various shapes and sizes for fitment of corresponding elements of the airbag frame device 11.

Figure 17B:
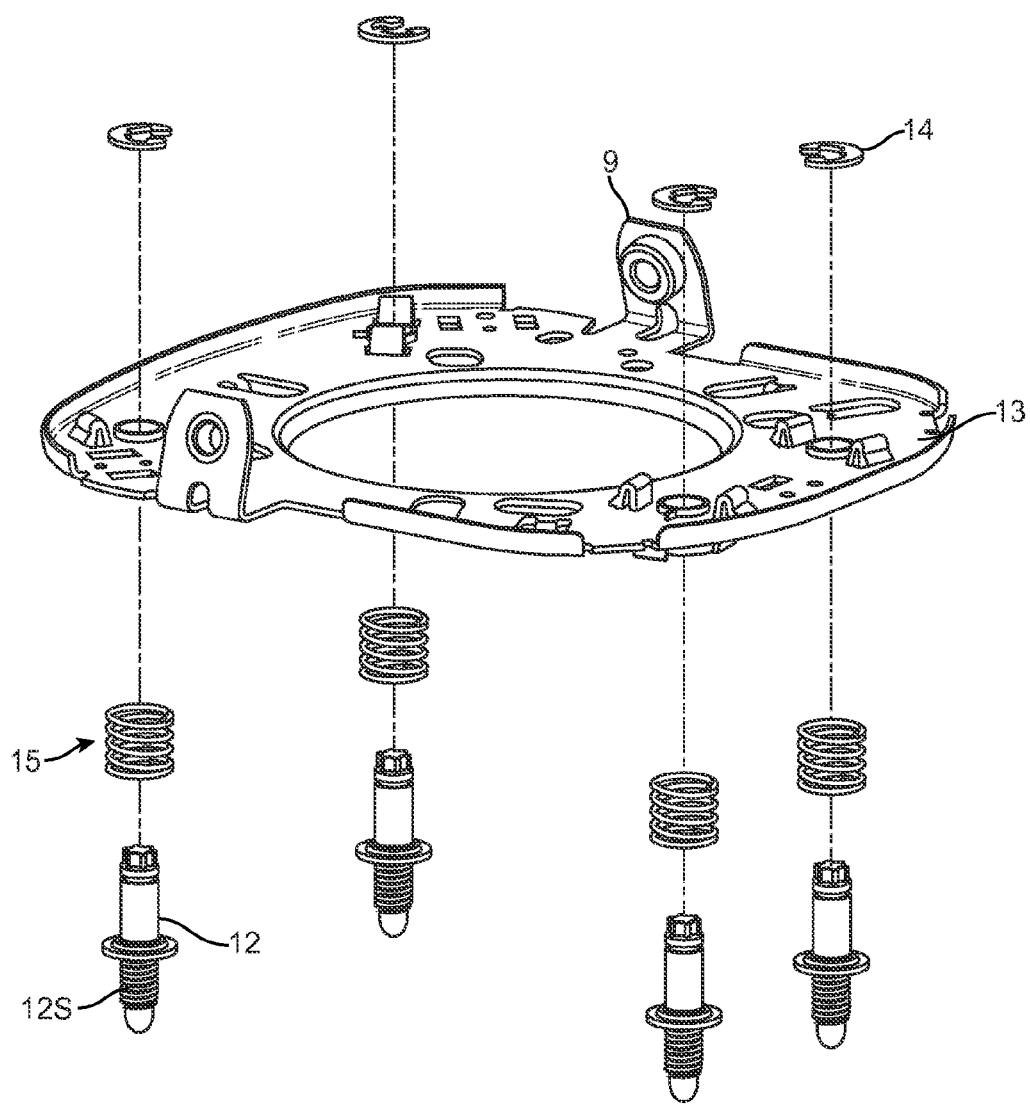
FIG. 17B illustrates an exploded view of an airbag support frame and support assemblies according to one embodiment of the invention.

FIG. 17B illustrates a bottom view of the frame plate 13 and exploded view of the support assemblies 12 according to one embodiment of the invention. As illustrated, the support assemblies 12 fit within the springs 15 and are placed through openings of the frame plate 13. In one example, the support assemblies are locked/fastened in place with the clip 14.

Referring back to FIGS. 5 and 6, the plate 13 includes a pair of steering wheel housing connectors 9 at its peripheries. Each connector 9 includes an extension 8 and an opening 7. The opening 7 allows attaching the plate 13 to a steering wheel housing via fasteners (e.g., bolts/nuts, sockets, pins, etc.). In one embodiment, each extension 8 is angled form the frame plate between about 70°-80°. In another embodiment, each opening 7 comprises a slot that ranges from about 2.2 mm-9.0 mm in length for fitment in a steering wheel housing. In one embodiment, each extension 8 includes score tabs for bending the extension 8 to provide adaptability in fitment within a steering housing.

FIG. 18 illustrates a front perspective view of the airbag frame device 11 coupled with an airbag assembly 30, wherein the plate 13 is and mounted on a steering wheel housing 10 according to one embodiment of the invention. The airbag assembly 30 is fixedly attached to the coupling members 12S. When compressed, the airbag assembly 30 can move towards and away from the frame plate 13, riding the coupling members 12S through the annular holders 15A into and out of the frame plate 13. The coupling members 12S move/slide axially along the center of the holder 15A essentially perpendicular/transverse to the surface of the planar frame plate 13. FIG. 18 shows the airbag assembly 30 while not under a compressive force, such the underside of the airbag frame 30 is not in contact with the switches 19.

Figure 19:
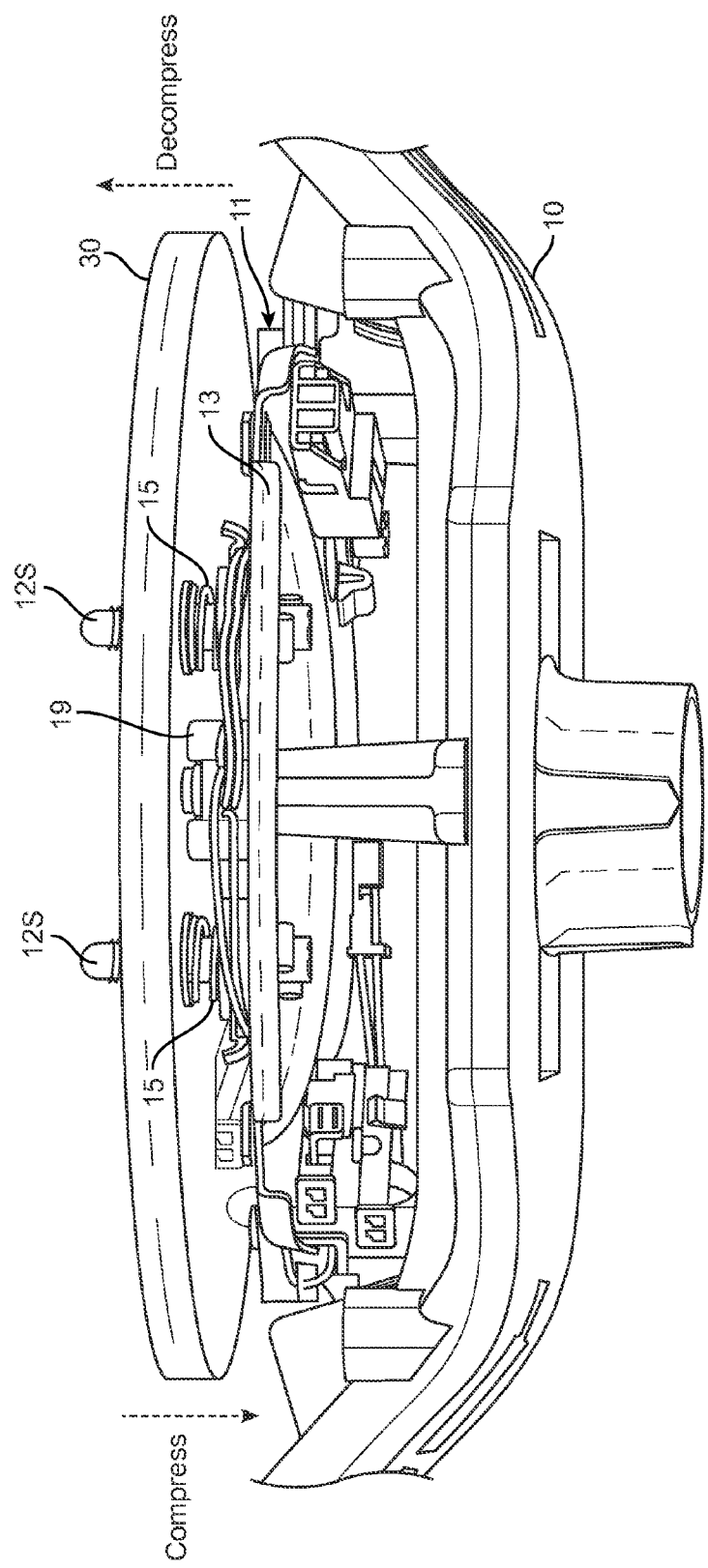
FIG. 19 illustrates a side perspective view of an airbag frame device coupled with an airbag assembly and steering wheel column/housing according to one embodiment of the invention.

FIG. 19 illustrates a side perspective view of an airbag frame device 11 coupled with an airbag assembly 30 of FIG. 18, wherein the frame plate 13 is mounted on the steering wheel housing 10 according to one embodiment of the invention. As in FIG. 18, the airbag assembly 30 is fixedly attached to the coupling members 12S.

FIG. 19 shows the airbag assembly 30 pressed down (compressed) towards the airbag frame device 11, wherein the compression members 15 are further compressed, allowing the coupling members 12S to slide down into respective openings in the frame plate 13. This allows the underside of the airbag assembly 30 to move towards the frame plate 13 and come into contact with the switches 19, closing an electrical circuit via the electrical wires 31 and wiring harness assembly 16 that may operate, for example, an electrical horn device for the vehicle. FIG. 19 shows the underside of the airbag assembly 30 pushed against one or more switched 19 by a compressive force, wherein said one or more switches closes one or more corresponding electrical circuits.

When pressure is removed from the airbag assembly 30, the springs 15 decompress and urge the airbag assembly 30 away from the frame plate 13, opening the switches 19, as in FIG. 18. As such, the airbag assembly 30 can move towards and away from the frame plate 13 along the dashed arrows shown in FIG. 19, riding the coupling members 12S into and out of the frame plate 13. The frame plate 13 remains in fixed relationship with the steering housing 10, while the airbag assembly 30 fixed to the coupling members 12S moves transversely in relation to the frame 13 as one or more springs 15 are compressed and decompressed and one or more coupling members 12S transversely slide into and out of the frame plate 13 (i.e., through annular openings in the corresponding brackets 15A and the frame 13).

Figure 20:
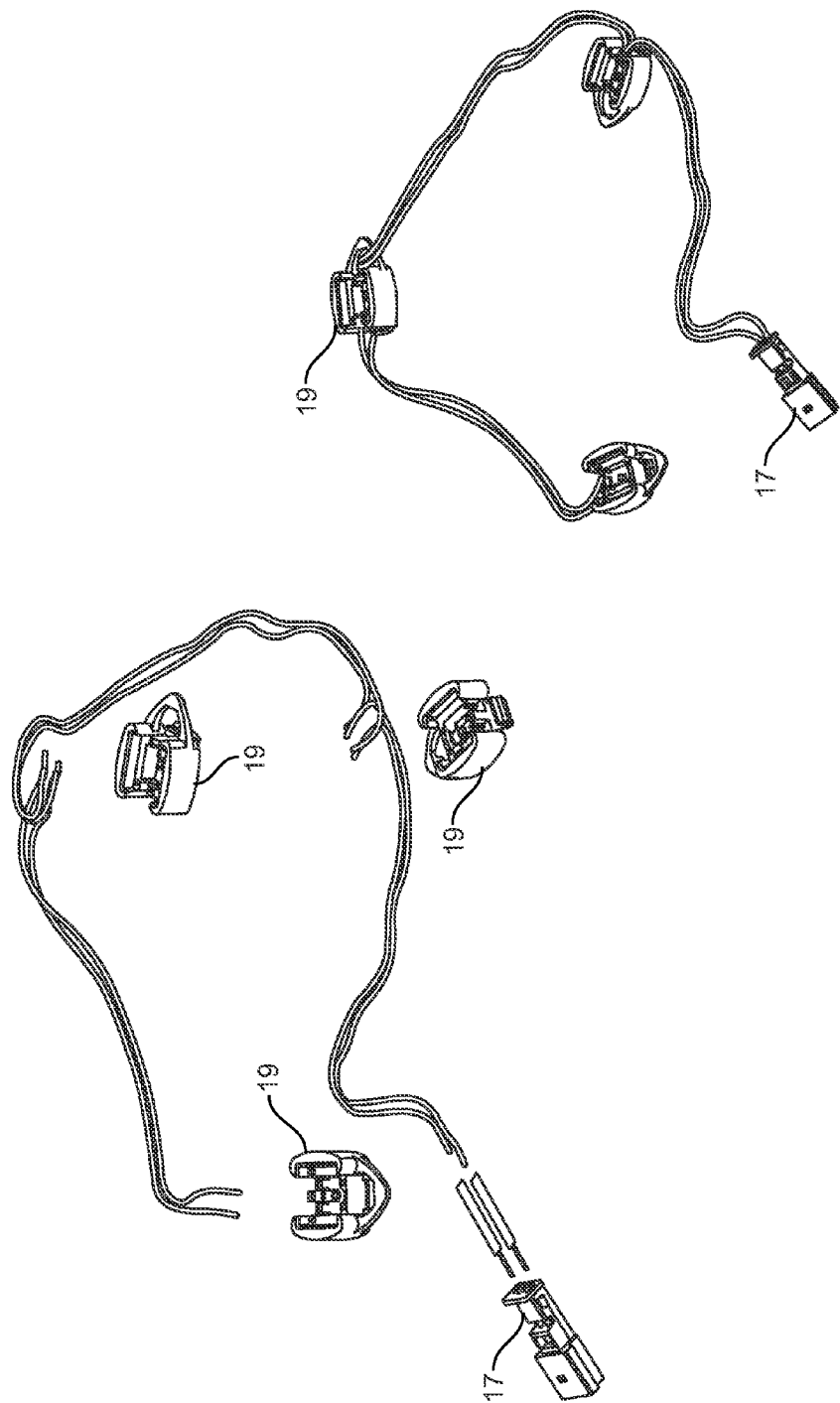
FIG. 20 illustrates an isolated view of an electrical switch assembly for an airbag frame according to one embodiment of the invention.

FIG. 20 illustrates an isolated view of an electrical switch assembly for the airbag frame device 11 according to one embodiment of the invention. In one example, the switches 19 are attached to the electrical wires 31 and the electrical connector 17 via known methods, such as crimping, soldering, pressure attachment, etc. In one example, a two wire system is used where the switches 19 maintain the separation of the two wires when in the open state and connect the two wires in the closed state to complete the electrical circuit.

Figure 21:
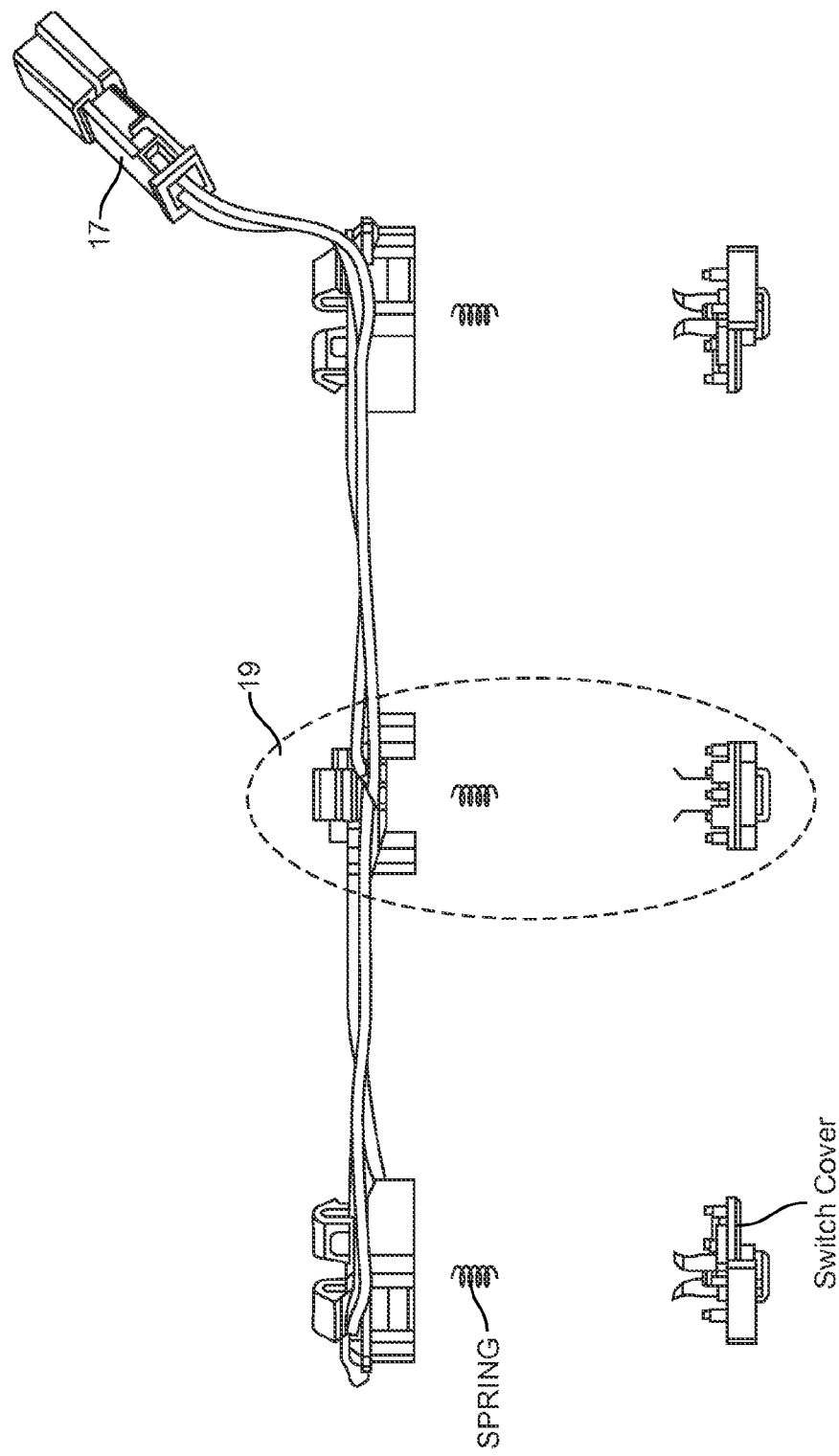
FIG. 21 illustrates an isolated side view of the electrical switch assembly of FIG. 20 showing an exploded view of switches according to one embodiment of the invention.

FIG. 21 illustrates an isolated side view of the electrical switch assembly of FIG. 20 showing an exploded view of switches 19 according to one embodiment of the invention. In one example, the switches 19 include a compression member, such as a spring that is used to return the switch to the open state when pressure is removed from the switch 19 (e.g., when pressure is removed from the airbag assembly 30). In one example, the switches 19 are formed by a switch housing/cover and an attachment portion, which may be separate components or integrated as a single component.

FIG. 22 illustrates a bottom perspective view of an airbag frame device 11 showing a locking/fastening portion 22 of a support assembly 12 according to another embodiment of the invention. In one embodiment, the locking/fastening portion 22 is a bolt/nut device that engages a threaded bolt 12S. In this embodiment, the clip 14 and notch 12N on the member 12S are not required (FIG. 16).

In one example, the locking/fastening portion 22 (FIG. 22) is made of a metal, metal alloy, hardened plastic, etc. On another example, the locking/fastening portion 22 is coupled with a washer 24 and a dampening element 23. In one embodiment, the washer 24 is a separate component and comprises a metal washer. In another embodiment, the washer 24 is integrated with the locking/fastening portion 22 (e.g., a flanged nut device).

In one embodiment, each dampening element 23 may comprise one or more compressible components, such as a rubber or similar material washers, disposed concentric with each coupling member 12S between a corresponding washer 24 and the frame plate 13. Each dampening element 23 prevents contact between the washer 23 and the frame plate 13. The dampening element 23 reduces/eliminates noise, vibrations, hum, rattles, etc. (e.g., BSR) that may otherwise be caused by impact between the washer 24 and the frame plate 13 (or bracket 15A and clip 14; or bracket 15A and washer 24) due to vibration of the steering column of a moving vehicle in which an airbag frame support device 11 (and airbag assembly 30) is mounted or movement of the components within the frame plate 13, according to embodiments of the invention. In other embodiments, equivalent dampening elements may include: rubber or similar material disposed on the frame plate 13 between the washer 24 and the frame plate 13, dampening coatings (e.g., flowed over the locking/fastening portion 22, etc. It should be noted that the dampening element 23 may be the same size, larger or smaller in diameter than the washer 24 and the locking/fastening portion 22.

FIG. 23 illustrates an isolated view of a locking/fastening portion 22 of a support assembly 12 for an airbag frame device 11 according to one embodiment of the invention. In one embodiment, the locking/fastening portion 22 may be a nut that fastens to a threaded portion of the element 12S and is tightened thereon with the dampening element 23 disposed underneath washer 24. In one embodiment, the dampening element 23 may also be utilized with the embodiment of device 11 shown in FIG. 8 wherein the dampening washer 23 may be disposed concentric with element 12S between the clip 14 and the frame plate 13.

Figure 24:
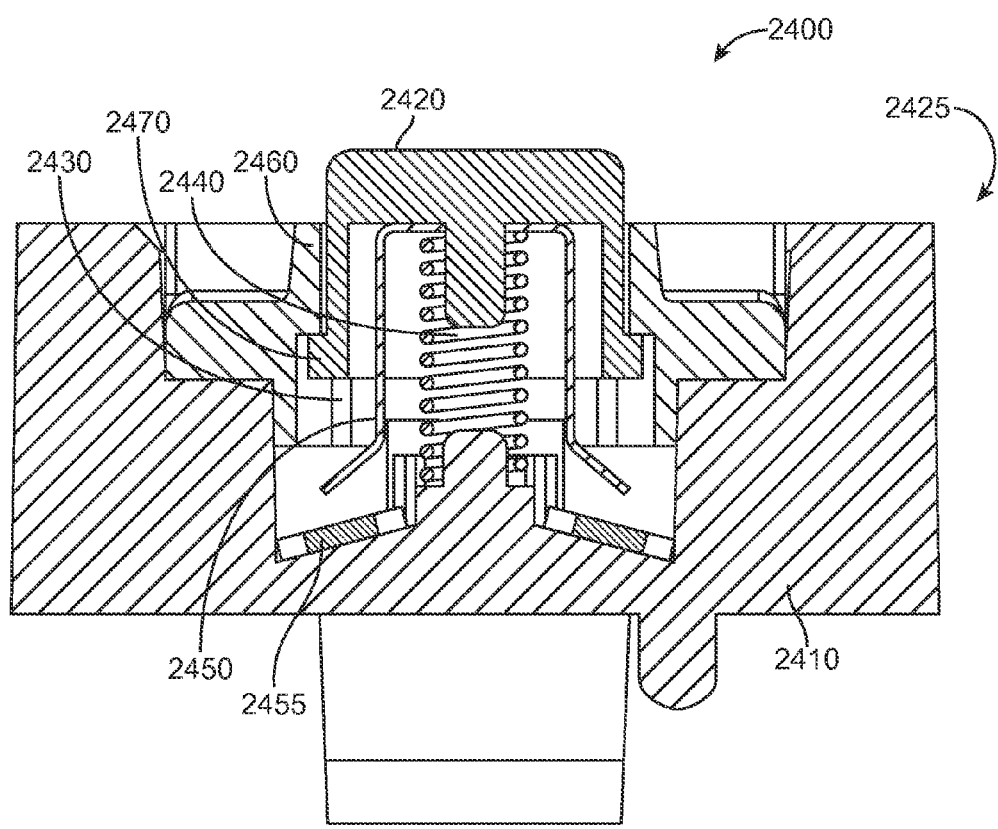
FIG. 24 illustrates an isolated cross-section view of an electrical switch for an airbag frame device according to one embodiment of the invention.

FIG. 24 illustrates an isolated cross-section view of an electrical switch 2400 for an airbag frame device (e.g., airbag frame device 11) according to one embodiment of the invention. In one embodiment, the electrical switch 2400 is similar to the switch assembly 19 and includes a switch assembly housing 2410, pushbutton (or plunger) 2420, spring 2440, switch connectors 2450, electrical contacts 2455, pushbutton height limiter 2460, and pushbutton stop element 2470. In one embodiment, the pushbutton 2420 has a height range 2425 between 0.050 to 0.065 inches, preferably 0.059 inches above the top of the switch assembly housing 2410.

In one embodiment, the electrical switch 2400 includes a gap 2430 between the bottom of the pushbutton stop element 2470 and a portion of the switch assembly housing 2410 in the range of 0.050 to 0.065 inches, preferably 0.059 inches. In one embodiment, the electrical switch 2400 is open (i.e., no electricity flows through the switch) when the switch connectors 2450 are not connected to the electrical contacts 2455.

In one embodiment, the force required to close the electrical switch 2400 is based on the spring elements 15 (FIG. 26) and the spring 2440 of the electrical switch assembly 2400. In one embodiment, the force required to close the electrical switch 2400 for sounding a horn is in a range of 4.5 to 5.5 Newtons, preferably 5 Newtons. In one embodiment, the pushbutton height limiter 2460 has a height range of 0.07 to 0.090 inches, preferably 0.080 inches.

Figure 25:
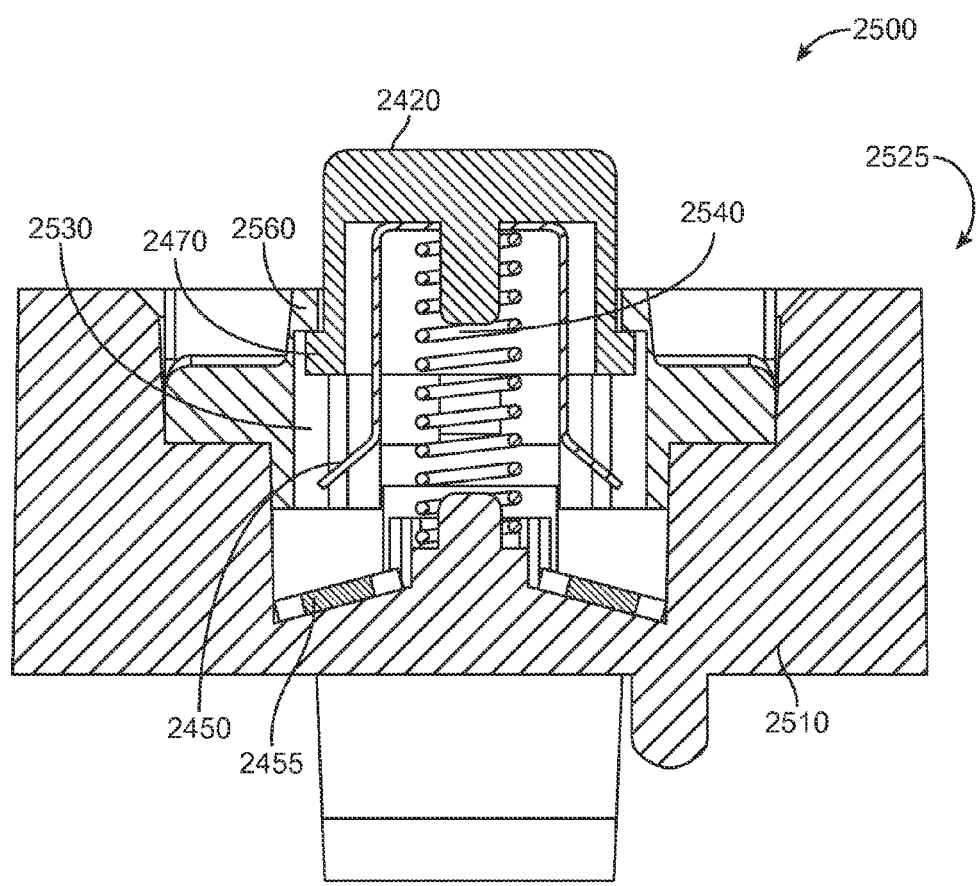
FIG. 25 illustrates an isolated cross-section view of an electrical switch for an airbag frame device according to another embodiment of the invention.

FIG. 25 illustrates an isolated cross-section view of an electrical switch 2500 for an airbag frame device (e.g., airbag frame device 11) according to one embodiment of the invention. In one embodiment, the electrical switch 2500 includes a switch assembly housing 2510, pushbutton 2420, spring 2540, switch connectors 2450, electrical contacts 2455, pushbutton height limiter 2560, and pushbutton stop element 2470. In one embodiment, the pushbutton 2420 has a height range 2525 between 0.105 to 0.115 inches, preferably 0.110 inches above the top of the switch assembly housing 2510. In one embodiment described herein below, the airbag frame device 11 includes one or more pushbutton switches 2500, instead of switches 2400. In one embodiment, the airbag frame support device 11 is attached (assembled) to the airbag assembly 30, wherein the distance between the plate 13 and airbag assembly 30 is selected such that the pushbutton 2420 of each switch 2500 is partially preloaded/depressed by the airbag assembly 30 (partially compressing spring 2540 but without the switch 2500 electrically closing a circuit). As such, the pushbutton 2420 is continuously urged against the airbag assembly 30 by the spring 2540. When the airbag assembly 30 is pushed against the plate 13 (e.g., by a driver), further depressing the pushbutton 2420 and further compressing the spring 2540 (and spring 15), the switch 2500 closes an electrical circuit (e.g., to sound a horn).

In one embodiment, the electrical switch 2500 includes a gap 2530 between the bottom of the pushbutton stop element 2470 and a portion of the switch assembly housing 2510 in the range of 0.095 to 0.120 inches, preferably 0.110 inches. In one embodiment, the gap 2530 has a further travel distance than the electrical switch 2400. In one embodiment, the electrical switch 2500 is open (i.e., no electricity flows through the switch) when the switch connectors 2450 are not connected to the electrical contacts 2455 (i.e., when the pushbutton 2420 is not sufficiently depressed).

In one embodiment, due to the location of the height limiter 2560 in the switch assembly housing 2510, the pushbutton 2420 of the electrical switch 2500 has a higher height relative to the switch assembly housing 2510, than the pushbutton 2420 of the electrical switch 2400 (FIG. 24), when the pushbutton 2420 is not depressed. Therefore, compared to the electrical switch 2400, the pushbutton 2420 of the electrical switch 2500 travels a longer distance from a normal position (not depressed) to a fully depressed position where the switch connectors 2450 contact the electrical contacts 2455. The greater travel for the pushbutton 2420 of the electrical switch 2500 relative to the housing 2510, in turn allows preloading of the pushbutton 2420 between the frame plate 13 of the device 11 and the airbag assembly 30, according to an embodiment as described hereinbelow in conjunction with FIG. 27, for example.

As noted, in one embodiment, when the device 11 utilizing an electrical switch 2500 is assembled to the airbag assembly 30 via airbag support assemblies 12, the pushbutton 2420 of the electrical switch 2500 is preloaded wherein the airbag assembly 30 depresses the pushbutton 2420 of the electrical switch 2500 slightly. The airbag assembly 30 depresses the pushbutton 2420 sufficiently into the housing 2510 to compress the spring 2540 and maintain spring-loaded contact between the pushbutton 2420 with the airbag assembly 30 even when the airbag assembly 30 is not depressed towards the pushbutton 2420 by a user (i.e., when the spring elements 15 (FIG. 27) are not compressed by an applied force (e.g., from a user)). In one embodiment, the pushbutton 2420 remains engaged with the airbag assembly 30 because the pushbutton 2420 of the switch 2500 is urged from the switch assembly housing 2510 by the spring 2540 towards the airbag assembly 30. Said greater travel for the pushbutton 2420 of the electrical switch 2500 relative to the housing 2510, allows preloading of the spring 2540 and pushbutton 2420 (i.e., partially depressed), while leaving sufficient travel for the pushbutton 2420 of the electrical switch 2500 such that the switch connectors 2450 do not come in contact with the electrical contacts 2455, unless the airbag assembly 30 is depressed sufficiently towards the plate 13 (pushing the pushbutton 2420 into the housing 2510 to cause contact between the switch connectors 2450 and the electrical contacts 2455), by a user who intends to close the horn circuit to sound the horn.

As such, when the device 11 is not assembled to the airbag assembly 30, the pushbutton 2420 is fully extended out of the housing 2510 when the pushbutton 2420 reaches the height limiter 2560 at the top of its travel range out of the housing 2510. According to an embodiment of the invention, preloading the pushbutton 2420 when the device 11 is assembled to the airbag assembly 30, depresses the pushbutton 2420 slightly below the height limiter 2560 without closing the normally open switch 2500, such that the pushbutton 2420 is partially extended out of the housing 2510 while the spring element 2540 urges the pushbutton 2420 against the airbag assembly 30.

In one embodiment, the force required to close the electrical switch 2500 is based on the spring elements 15 (FIG. 27) and the spring 2540 of the electrical switch assembly 2500. In one embodiment, the force required to close the electrical switch 2500 is primarily based on the spring elements 15. In one embodiment, the force required to close the electrical switch 2500 for sounding a horn is in a range of 1.25 to 1.75 Newtons, preferably 1.5 Newtons. In one embodiment, the pushbutton height limiter 2560 has a height range of 0.020 to 0.040 inches, preferably 0.030 inches.

Figure 26:
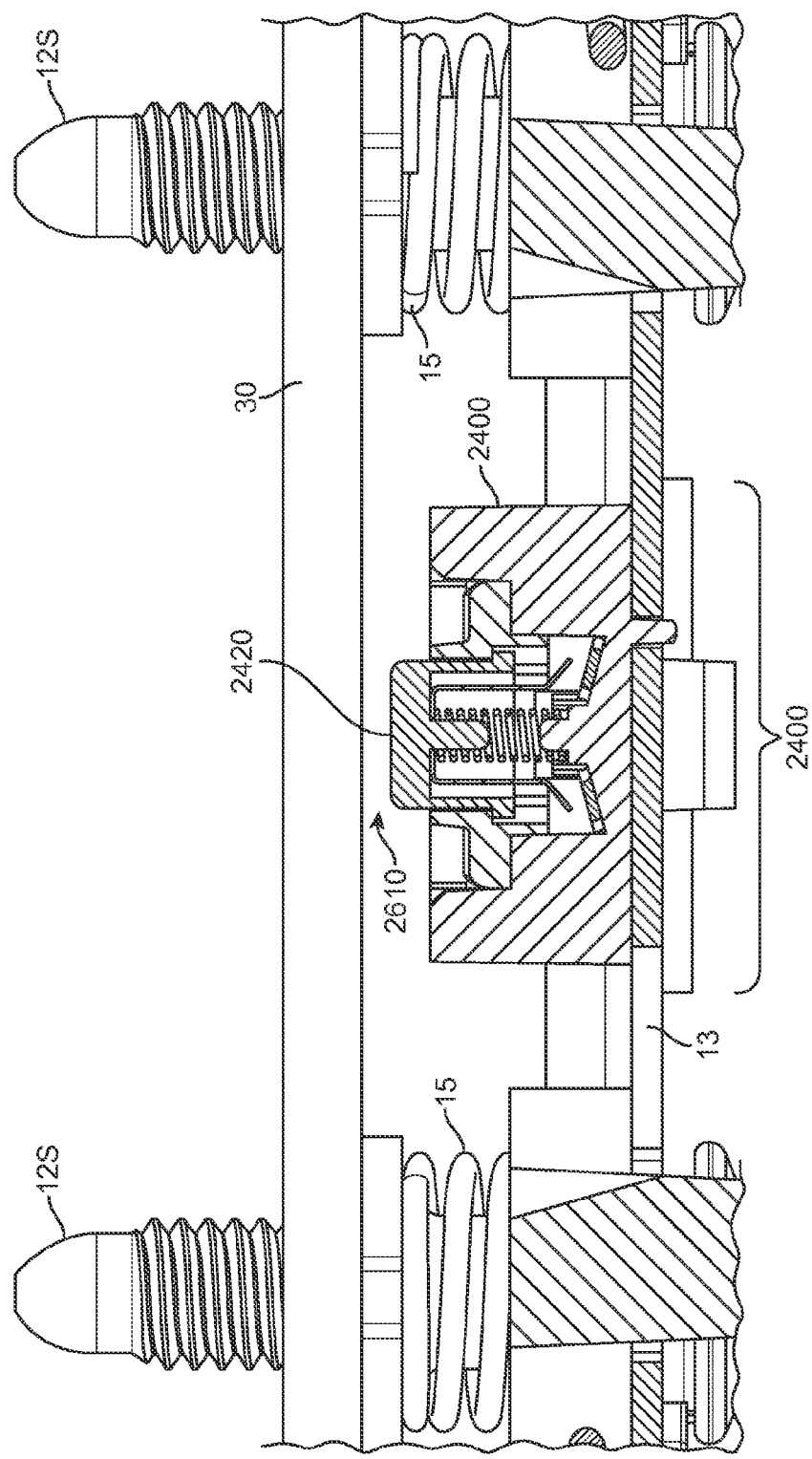
FIG. 26 illustrates a cross-section view of an electrical switch shown in FIG. 24 that is coupled with a frame according to one embodiment.

FIG. 26 illustrates a cross-section view of an electrical switch 2400 that is coupled with a frame (e.g., airbag frame device 11) and airbag assembly 30 according to one embodiment. As shown, the electrical switch 2400 is attached to the frame between airbag support assemblies (e.g., airbag support assemblies 12, FIG. 2) where the spring element 15 is located beneath the airbag assembly 30 and the airbag coupling member 12S is located above the airbag assembly 30. As shown, the pushbutton 2420 is not engaged with the airbag assembly 30 when the pushbutton 2420 is extended to its maximum height (e.g., 0.059 inches) above the top of the switch assembly housing 2410. In one embodiment, a gap or distance 2610 is present when the pushbutton 2420 of the electrical switch 2400 is at its maximum height possible to travel above the top of the switch assembly housing 2410 when no force is applied on the airbag assembly 30 towards the pushbutton 2420.

Figure 27:
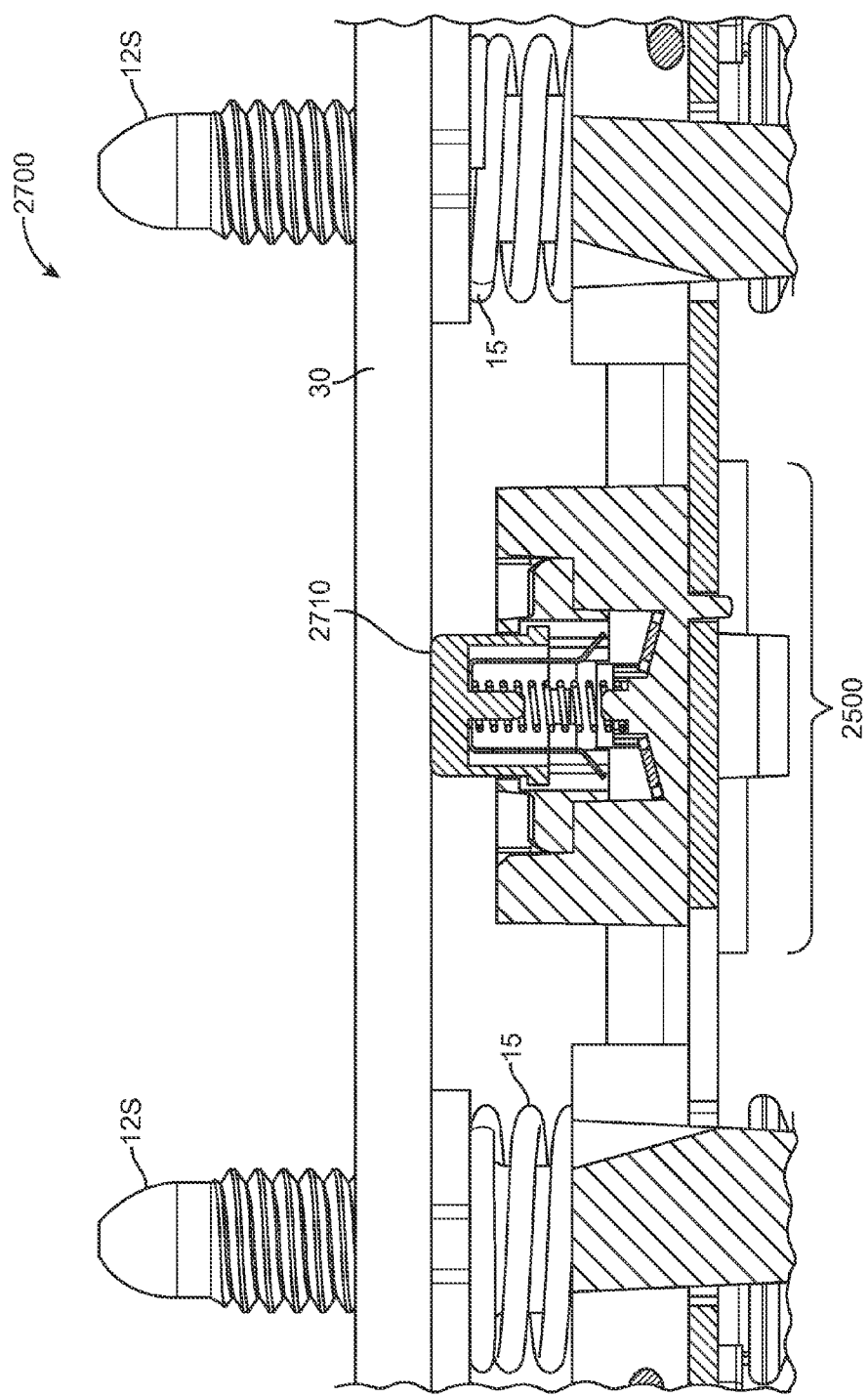
FIG. 27 illustrates a cross-section view of an electrical switch shown in FIG. 25 that is coupled with a frame and an airbag device according to one embodiment.

FIG. 27 illustrates a cross-section view 2700 of an electrical switch 2500 that is coupled with a frame (e.g., airbag frame device 11) and airbag assembly 30, according to another embodiment. As shown, the electrical switch 2500 is attached to the frame between airbag support assemblies (e.g., airbag support assemblies 12, FIG. 2) where the spring element 15 is located beneath the airbag assembly 30 and the airbag coupling member 12S is located above the airbag assembly 30. As shown, the pushbutton 2420 of the electrical switch 2500 is engaged with the airbag assembly 30 when the pushbutton 2420 is not extended to its maximum height (e.g., 0.059 inches) above the top of the switch assembly housing 2510. In one embodiment, no gap is present at the point of contact 2710 between the pushbutton 2420 of the electrical switch 2500 and the airbag assembly 30 when no external force is applied to the airbag assembly 30 towards the pushbutton 2420.

In the embodiment shown in FIG. 27, utilizing a switch 2500 and assembling the frame 11 to the airbag assembly 30, vibration reduction and noise reduction is achieved because the pushbutton 2420 is continuously engaged with (i.e., continuously urged against) the airbag assembly 30 (FIG. 27) by the preloaded spring 2540. Due to such preloading, there is no gap between the tip of the pushbutton 2420 and the airbag assembly 30 (even when the frame plate 13 is not depressed against the frame 11 by a force). As there is no gap between the pushbutton 2420 and the airbag assembly 30, vibration from the frame plate 13 while a vehicle is in motion, prevents impact between the pushbutton 2420 and the airbag assembly 30 when springs 15 may be partially compressed by the weight of the airbag assembly 30. Such impact can generate unwanted noise and vibration.

Figure 28:
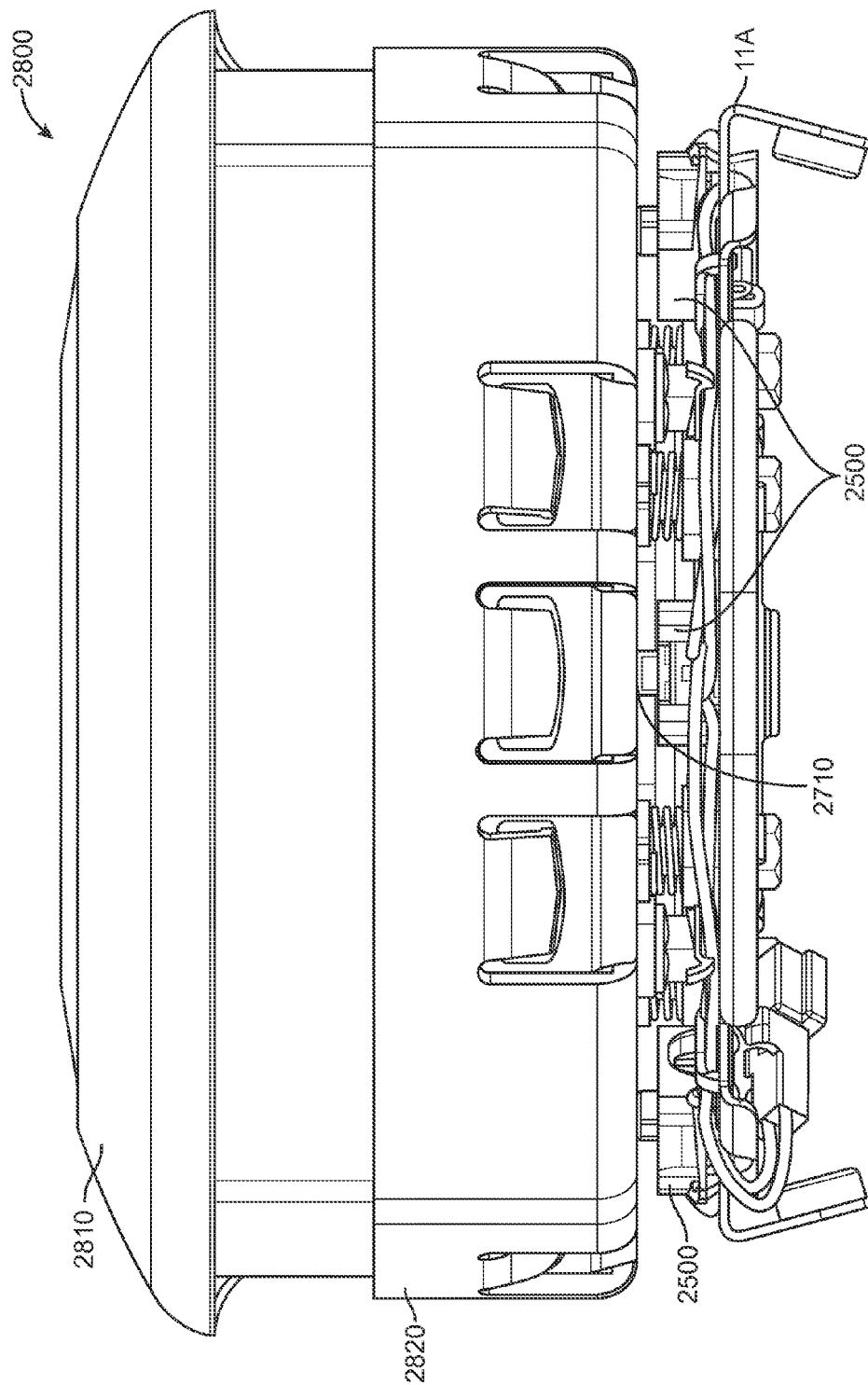
FIG. 28 illustrates a view of an airbag device with an electrical switch as shown in FIG. 25 that is coupled with a frame and the airbag device according to one embodiment.

FIG. 28 illustrates a view of an airbag device 2800 with electrical switches 2500 that are coupled with an airbag frame device 11A and an airbag device comprising an airbag 2810 and airbag support 2820 according to one embodiment. As shown, in one embodiment, a point of contact 2710 continuously exists between the pushbutton 2420 of the electrical switch 2500 and the airbag assembly 30 (shown as the airbag 2810 and the airbag support 2820). In one embodiment, the spring element 15 coupled with the airbag coupling member 12S applies force to the airbag support 2820 to prevent the pushbutton 2420 of the electrical switch 2500 from depressing further without additional force (e.g., 1.5 Newtons) in the direction towards the pushbutton 2420 (which is required to depress the pushbutton 2420 to close the electrical switch 2500 and sound a horn).

Figure 29:
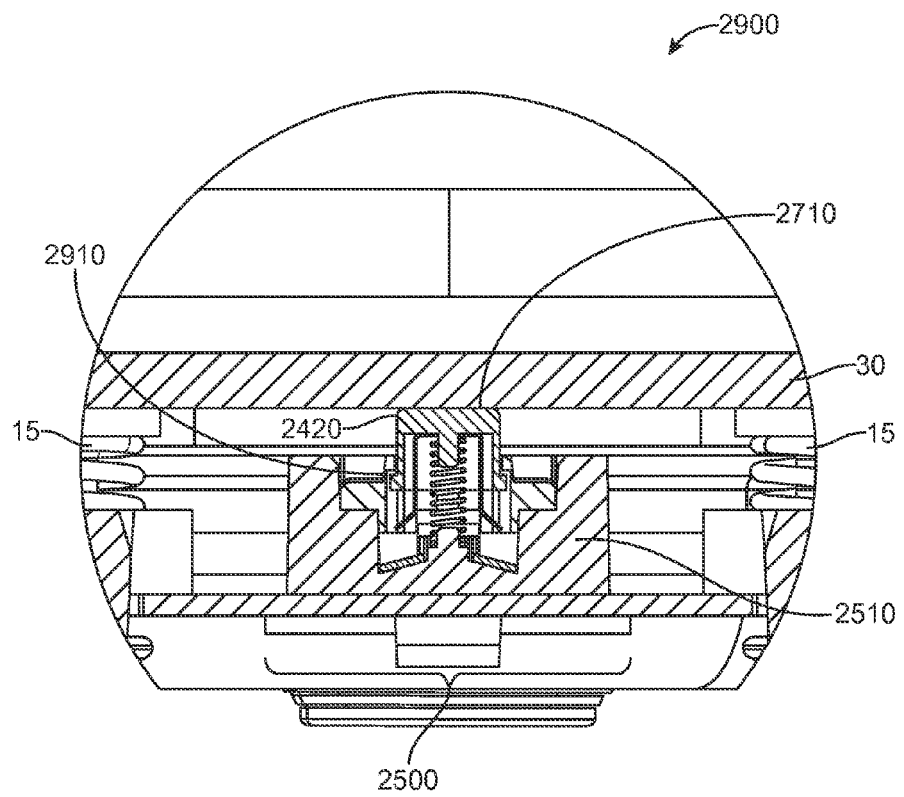
FIG. 29 illustrates a cross-section view of an electrical switch shown in FIG. 25 that is coupled with a frame and an airbag device according to one embodiment.

FIG. 29 illustrates a cross-section view 2900 of an electrical switch 2500 that is coupled with a frame (e.g., airbag frame device 11, FIG. 2) and an airbag assembly 30 according to one embodiment. As shown in FIG. 29, in one embodiment, the pushbutton 2420 of the electrical switch 2500 is engaged with the airbag assembly 30. In one embodiment, the airbag assembly 30 depresses the pushbutton 2420 of the electrical switch 2500 slightly (e.g., enough force to compress the spring 2540 to maintain contact of the pushbutton 2420 with the airbag assembly 30) when the airbag assembly 30 is not depressed towards the pushbutton 2420 (i.e., when the spring elements 15 are not compressed by an applied force (e.g., from a user)). In one embodiment, since the airbag assembly slightly depresses (i.e., preloads) the pushbutton 2420 of the electrical switch 2500, a space 2910 exists between the pushbutton stop element 2470 and the pushbutton height limiter 2560. In one embodiment, the space 2910 has a range of 0.010 to 0.025 inches, preferably 0.015 inches.

Figure 30:
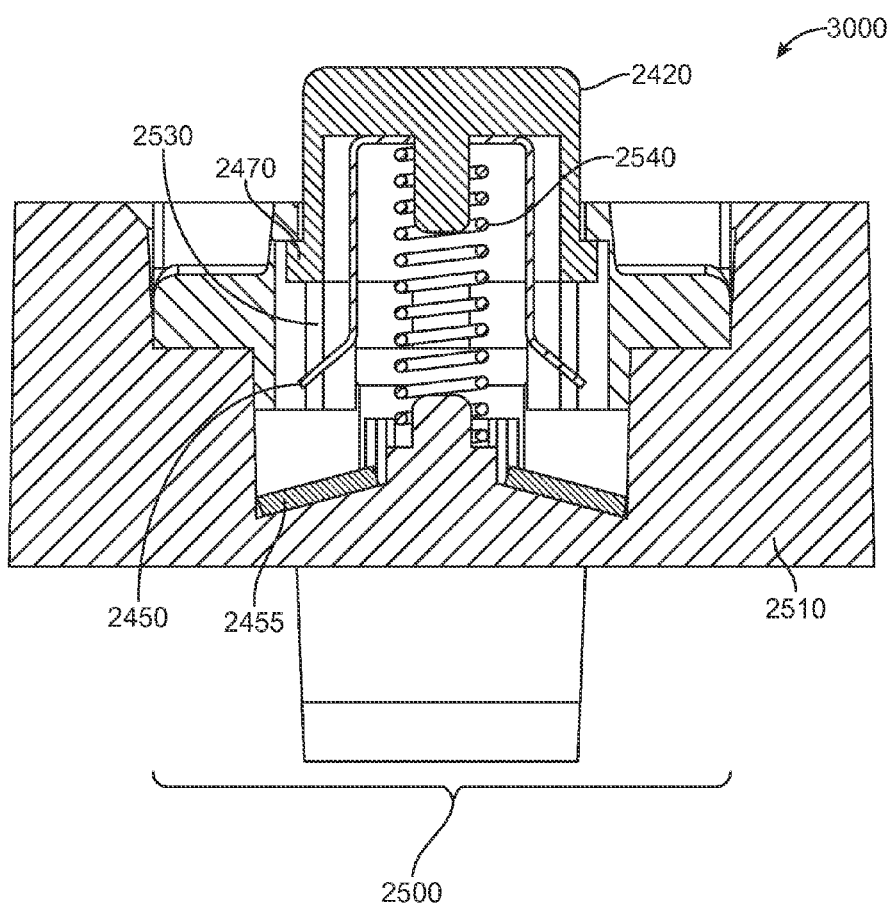
FIG. 30 illustrates a cross-section view of an electrical switch shown in FIG. 25 and shown in an open-switch state according to one embodiment.

FIG. 30 illustrates a cross-section view 3000 of an isolated electrical switch (e.g., electrical switch 2500, FIG. 25) and shown in an open-switch state where the switch connectors 2450 are not in contact with the electrical contacts 2455 according to one embodiment. In one embodiment, since the airbag assembly 30 (FIG. 27) is not in contact with the pushbutton 2420, there is no force acting on the pushbutton 2420, and therefore, there is not a space 2910 (FIG. 29) formed between the pushbutton stop element 2470 and the pushbutton height limiter 2560. In one example, the pushbutton 2420 is shown in a fully extended height above the top of the switch assembly housing 2510.

Figure 31:
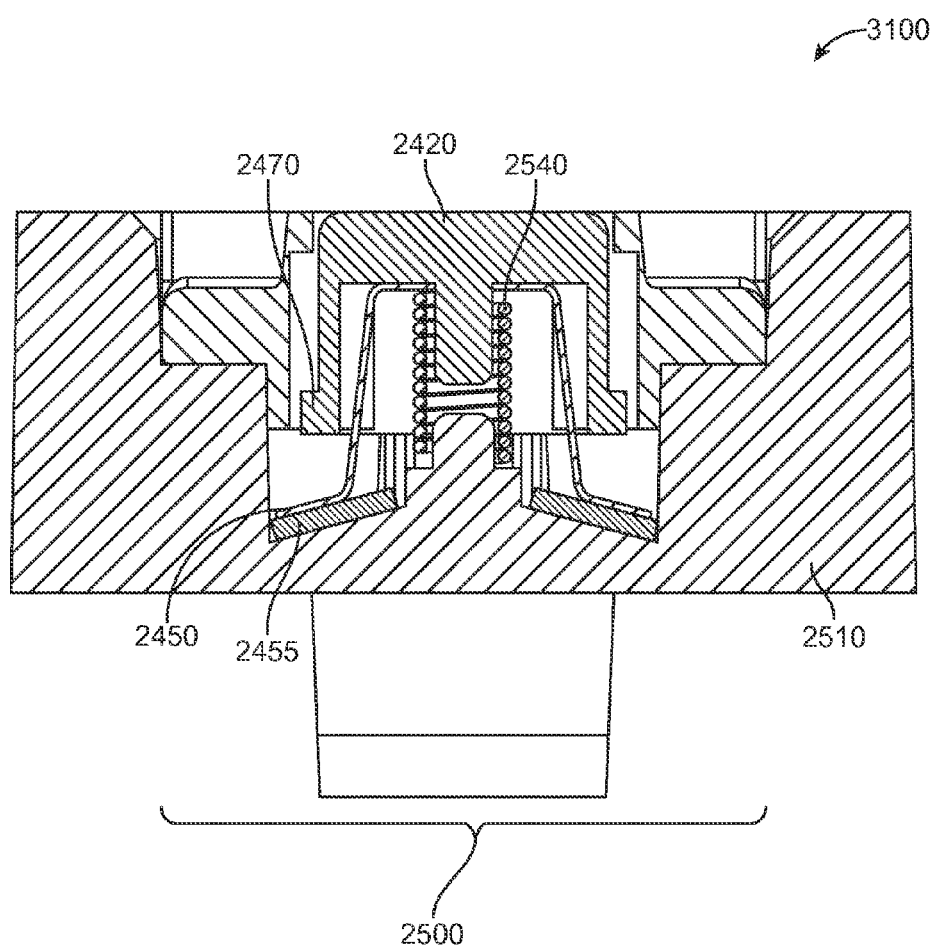
FIG. 31 illustrates a cross-section view of an electrical switch shown in FIG. 25 and shown in a closed-switch state according to one embodiment.

FIG. 31 illustrates a cross-section view 3100 of an isolated electrical switch (e.g., electrical switch 2500, FIG. 25) and shown in a closed-switch state where the switch connectors 2450 are in direct contact with the electrical contacts 2455 according to one embodiment. In one embodiment, the view 3100 represents the state where the airbag assembly 30 (FIG. 27) depresses the pushbutton 2420 a distance enough to close the electrical switch based on an external force acting on the airbag assembly 30 (e.g., from a user desiring to sound a horn). In one example, the pushbutton 2420 is shown in a fully depressed position even (i.e., flush) with the top of the switch assembly housing 2510.

Figure 32:
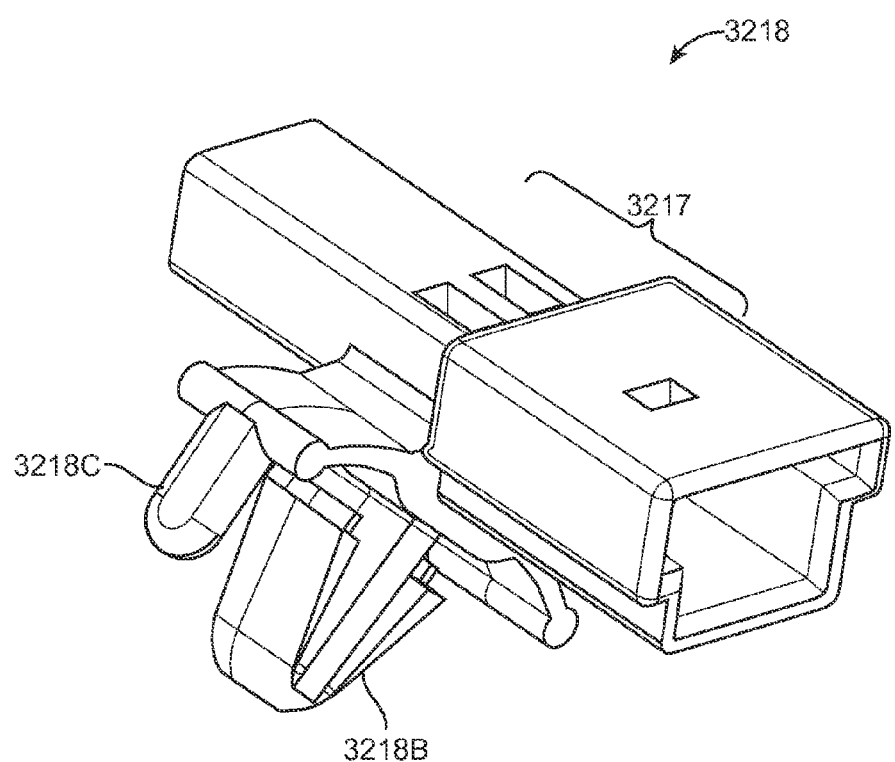
FIG. 32 illustrates a one-piece electrical connector including a harness holder according to one embodiment of the invention.

FIG. 32 illustrates a view of a wiring harness assembly 3218 including the electrical connector 3217, and a wiring harness holder comprising insertion tip 3218B and tab 3218C, according to one embodiment of the invention. The electrical connector 3217 is integrated with the wiring harness holder in a single component (i.e., formed as one piece). In one embodiment, the electrical connector 3217 of the wiring harness assembly 3218 is configured for connecting to a corresponding electrical horn connector.

The wiring harness 3218 is configured for connecting to the frame plate 13 (FIG. 3, similarly as wiring harness 16) via a wiring harness holder. The electrical wires 31 (FIG. 2), electrical switches 2500 (FIG. 28) and an electrical connector 3217 are coupled to a wiring harness assembly 3218. In one example the wiring harness holder snaps into openings in the frame plate 13.

In one embodiment, the harness holder includes an insertion tip 3218B and a tab 3218C. In one example, the insertion tip 3218B and the tab 3218C are inserted through corresponding apertures of the frame plate 13 to snap the harness holder onto the frame plate 13. In one embodiment of the invention, the tab 3218C prevents the harness holder from rotating on the frame plate 13.

In one example embodiment, the electrical connector 3217 includes inlet and outlet openings for receiving electrical connections such as via wires. In one example, the electrical connector includes metal pins attached to wires, which connect to the switches 2500 (FIG. 28) in parallel. In another example, the electrical connector is attached to the frame plate 13 via a connector adapter.

In one embodiment, the insertion tip 3218B and tab 3218C are sized for insertion through corresponding apertures of the frame plate 13. In this example, the harness assembly 3218 includes one or more tabs that rest on a bottom surface of the frame plate 13 for additional support and prevention of movement of the wiring harness assembly 3218 for wire management.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for supporting a vehicle airbag device, comprising:
   a frame having a plurality of openings for slidably receiving a plurality of airbag support assemblies, wherein each support assembly comprises:
   an airbag coupling member slidably disposed in a corresponding one of said openings in the frame for maintaining a spring member between the frame and the airbag device, the airbag coupling member having a coupling end protruding from a first side of the frame facing the airbag device for coupling to the airbag device, wherein pressing the airbag device towards the frame compresses the spring member therebetween; and
   an electrical switch assembly coupled to the frame, wherein the electrical switch assembly comprises at least one electrical switch for an electrical circuit, the electrical switch having a pushbutton and configured such that the pushbutton continuously engages the airbag device when the frame is coupled to the airbag device via an airbag coupling member, to maintain the electrical switch between the frame and the airbag device.

2. The apparatus of claim 1, wherein:
   the electrical switch comprises a spring element coupled to the pushbutton; and
   the electrical switch comprises a pushbutton height limiter providing sufficient travel for the pushbutton for pre-loading of the pushbutton against the airbag device when the frame is coupled to the airbag device via an airbag coupling member, such that the airbag device partially depresses the pushbutton and the spring element against the frame while the electrical circuit remains open.

3. The apparatus of claim 2, wherein the at least one pushbutton extends a distance in a range of 0.1 to 0.15 from a top of the electrical switch assembly.

4. The apparatus of claim 3, wherein a force required to close the electrical switch for sounding a horn is in a range of 1.25 to 1.75 Newtons.

5. The apparatus of claim 1, wherein the spring element applies a force to the pushbutton for urging the pushbutton against the airbag device while the pushbutton is extended from a housing of the electrical switch.

6. The apparatus of claim 5, wherein vibration noise from movement of the electrical switch relative to the airbag device is reduced based on continuous engagement between the pushbutton and the airbag device.

7. The apparatus of claim 1, wherein the airbag coupling member comprises a locking member at a locking end of the airbag coupling member protruding from a second side of the frame opposing said first side, for slidably maintaining the frame on the airbag coupling member between the locking member and the airbag device.

8. The apparatus of claim 7, further comprising:
   a bracket disposed at said corresponding opening on the frame for receiving the airbag coupling member such that the airbag coupling member is movable relative to the bracket; and
   a vibration reduction member between the frame and the locking member,
   wherein:
   the frame includes an essentially planar portion having said openings, each opening for slidably receiving a portion of an airbag coupling member of a corresponding support assembly, transverse to said planar portion of the frame, such that pressing the airbag device towards the frame compresses the spring member and causes at least a portion of said airbag coupling member to slide into the opening for lowering a portion of the airbag device towards the frame;
   the frame comprises a steering wheel coupling portion configured for coupling the frame to a steering wheel;
   each bracket includes an opening for receiving a corresponding coupling member, and an attachment portion for coupling with the frame;
   for each locking member, said locking end protruding from the second side of the frame is distal from said coupling end of the airbag coupling member;
   the spring member of each support assembly is disposed concentric with said portion of the airbag coupling member protruding from said first side of the frame facing the airbag device, to normally urge the locking member against said second side of the frame as the spring member urges the airbag device away from said first side of the frame; and
   pressing the airbag device towards the frame with sufficient force compresses the spring member to lower the airbag device towards the frame.

9. The apparatus of claim 8, wherein the spring member of each support assembly is disposed in said bracket concentric with said portion of the airbag coupling member protruding from said first side of the frame facing the airbag device;
   wherein each bracket further comprises a wire management mechanism comprising a tab for maintaining wiring for the switching assembly against the frame;
   wherein each switch further comprises a wire management mechanism comprising a tab for maintaining wiring for the switching assembly against the frame;
   wherein in each support assembly, the vibration reduction member is coupled between the second side of the frame and the airbag coupling member to prevent direct contact between the frame and a portion of the airbag coupling member;
   wherein the vibration reduction member comprises an elastic washer disposed concentric with the airbag coupling member between the second side of the frame and the locking member to dampen vibration between the airbag coupling member and the frame.

10. A system comprising:
    a vehicle airbag element;
    a frame for supporting the vehicle airbag element;
    one or more support assemblies, each support assembly slidably coupled to an opening in the frame, wherein each support assembly comprises an airbag coupling member having a coupling end engaged to the airbag element, the airbag coupling member maintaining a spring member between the frame and the airbag device such that pressing the airbag element towards the frame compresses the spring member therebetween; and
    an electrical switch assembly coupled to the frame, wherein the electrical switch assembly comprises at least one pushbutton for an electrical switch that couples to an electrical circuit, wherein the at least one pushbutton is continuously engaged with the airbag element.

11. The system of claim 10, wherein the electrical switch assembly comprises a spring coupled to the at least one pushbutton, wherein the airbag element depresses the at least one pushbutton when the airbag element is not depressed towards the at least one pushbutton.

12. The system of claim 11, wherein the at least one pushbutton extends a distance in a range of 0.1 to 0.15 from a top of the electrical switch assembly.

13. The system of claim 12, wherein a force required to close the electrical switch for sounding a horn is in a range of 1.25 to 1.75 Newtons.

14. The system of claim 13, wherein the spring applies a force to the at least one pushbutton for directly coupling the at least one pushbutton against the airbag element while the at least one pushbutton is fully extended from the top of the electrical switch assembly.

15. The system of claim 14, wherein vibration noise caused by movement of the electrical switch assembly is reduced based on continuous engagement between the electrical switch assembly and the airbag element.

16. The system of claim 14, further comprising:
 a vibration reduction member between the frame and a portion of an airbag coupling member,
 wherein pressing the airbag element a predetermined distance lowers a portion of at least one of the airbag coupling members towards the frame for urging the airbag element to compress the spring of the electrical switch in the electrical switch assembly.

17. The system of claim 16, wherein:
 the frame includes an essentially planar portion having said openings for slidably receiving a portion of an airbag coupling member of a support assembly transverse to said planar portion of the frame, such that pressing the airbag element towards the frame compresses the spring member and causes at least a portion of said airbag coupling member to slide into the opening for lowering a portion of the airbag element towards the frame; and
 the frame comprises a steering wheel coupling portion configured for coupling the frame to a steering wheel.

18. An apparatus, comprising:
 an airbag device;
 an essentially planar frame for supporting the airbag device, the frame having a plurality of openings for slidably receiving a plurality of airbag support assemblies transverse to the frame, the frame further comprising a steering wheel coupling portion configured for coupling the frame to a steering wheel, wherein each support assembly comprises:
 an airbag coupling member slidably disposed in a corresponding one of said openings in the frame for maintaining a spring member between the frame and the airbag device, the airbag coupling member having a coupling end protruding from a first side of the frame facing the airbag device for coupling to the airbag device, wherein pressing the airbag device towards the frame compresses the spring member therebetween;
 the airbag coupling member having a locking member at a locking end of the airbag coupling member protruding from a second side of the frame opposing said first side, for slidably maintaining the frame on the airbag coupling member between the locking member and the airbag device; and
 an electrical switch assembly coupled to the frame, wherein the electrical switch assembly comprises at least one pushbutton for an electrical switch for coupling to an electrical circuit, wherein the at least one pushbutton is continuously engaged with the airbag device.

19. The apparatus of claim 18, further comprising a bracket disposed at said corresponding opening on the frame for receiving the airbag coupling member such that the airbag coupling member is movable relative to the bracket, wherein the bracket comprises an annular holder partially surrounding the airbag coupling member, and the bracket has a bottom wall a portion of which protrudes through a corresponding frame opening to the second side of the frame;
 wherein the spring member of each support assembly is disposed in said bracket concentric with said portion of the airbag coupling member protruding from said first side of the frame facing the airbag device; and
 a vibration reduction member between the frame and the locking member to prevent direct contact between the frame and a portion of the locking member.

20. The apparatus of claim 19, wherein the electrical switch assembly comprises a spring coupled to the at least one pushbutton, wherein the airbag device depresses the at least one pushbutton when the airbag device is not depressed towards the at least one pushbutton;
 wherein the spring applies a force to the at least one pushbutton for directly coupling the at least one pushbutton against the airbag device while the at least one pushbutton is fully extended from the top of the electrical switch assembly;
 wherein vibration noise of the electrical switch assembly caused by movement of a vehicle coupled with the frame is reduced based on continuous engagement between the electrical switch assembly and the airbag device.

* * * * *